(12) United States Patent
Sun et al.

(10) Patent No.: US 7,288,134 B2
(45) Date of Patent: Oct. 30, 2007

(54) DUMBBELL-LIKE NANOPARTICLES AND A PROCESS OF FORMING THE SAME

(75) Inventors: Shouheng Sun, Millwodd, NY (US); Heng Yu, Yorktown Heights, NY (US); Shan X. Wang, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/938,897

(22) Filed: Sep. 10, 2004

(65) Prior Publication Data

US 2006/0053971 A1 Mar. 16, 2006

(51) Int. Cl.
*B22F 1/02* (2006.01)

(52) U.S. Cl. .............................. 75/348; 75/351; 75/370; 977/835

(58) Field of Classification Search .................. 75/348, 75/351, 370; 977/783, 813, 835
See application file for complete search history.

(56) References Cited

U.S. PATENT DOCUMENTS

| | | | |
|---|---|---|---|
| 4,853,335 A | 8/1989 | Olsen et al. | |
| 5,294,369 A | 3/1994 | Shigekawa et al. | |
| 5,360,895 A | 11/1994 | Hainfeld et al. | |
| 5,384,073 A | 1/1995 | Shigekawa et al. | |
| 5,472,881 A | 12/1995 | Beebe et al. | |
| 5,508,164 A | 4/1996 | Kausch et al. | |
| 5,571,726 A | 11/1996 | Brooks, Jr. et al. | |
| 5,681,943 A | 10/1997 | Letsinger et al. | |
| 5,922,537 A | 7/1999 | Ewart et al. | |
| 5,990,479 A | 11/1999 | Weiss et al. | |
| 6,025,202 A | 2/2000 | Natan | |
| 6,123,920 A | 9/2000 | Gunther et al. | |
| 6,149,868 A | 11/2000 | Natan et al. | |
| 6,203,777 B1 | 3/2001 | Schroder | |
| 6,214,560 B1 | 4/2001 | Yguerabide et al. | |
| 6,251,303 B1 | 6/2001 | Bawendi et al. | |

(Continued)

OTHER PUBLICATIONS

Zhou, et al., "Gold-Coated Iron (Fe@Au) Nanoparticles: Synthesis, Characterization, and Magnetic Field-Induced Self-Assembly", Journal of Solid State Chemistry 159, pp. 26-31, 2001.

(Continued)

*Primary Examiner*—George P. Wyszomierski
(74) *Attorney, Agent, or Firm*—Gibb & Rahman, LLC; Ido Tuchman, Esq.

(57) ABSTRACT

Dumbbell-shaped or flower-shaped nanoparticles and a process of forming the same, wherein the process comprises forming a mixture of a nanoparticle with a precursor in a first solvent, wherein the nanoparticle comprises a hydrophobic outer coating; heating the mixture; cooling the mixture to room temperature; modifying the hydrophobic outer coating into a hydrophilic outer coating; precipitating a solid product from the mixture, and dispersing the product in a second solvent. The nanoparticles comprise any of a semiconducting, magnetic, and noble metallic material, wherein the nanoparticles comprise a first portion comprising any of PbSe, PbS, CdSe, CdS, ZnS, Au, Ag, Pd, and Pt, and wherein the precursor comprises any of a cationic, neutral or particulate Au, Ag, Pd, Pt, or transition metal (Fe, Co, Ni) precursors of $Fe(CO)_5$, $Co(CO)_8$, $Ni(CO)_4$ or their analogues. The first and second solvents comprise any of alkanes, arenes, ethers, nitrites, ketones, and chlorinated hydrocarbons.

11 Claims, 21 Drawing Sheets

U.S. PATENT DOCUMENTS

| | | | |
|---|---|---|---|
| 6,306,610 | B1 | 10/2001 | Bawendi et al. |
| 6,417,340 | B1 | 7/2002 | Mirkin et al. |
| 2002/0045045 | A1* | 4/2002 | Adams et al. ............... 428/403 |
| 2005/0165120 | A1* | 7/2005 | Kumar et al. .................. 516/78 |
| 2006/0286379 | A1* | 12/2006 | Gao ........................... 428/403 |

OTHER PUBLICATIONS

Petit, et al., "Dissymmetric Silica Nanospheres: A First Step to Difunctionalized Nanomaterials", Journal of Materials Communication Chemistry, 10, pp. 253-254, 2000.

Charnay, et al.; "Reduced Symmetry Metallodielectric Nanoparticles: Chemical Synthesis and Plasmonic Properties", J. Phys. Chem. B, 107, pp.7327-7333, 2003.

Lu, et al., "Asymmetric Dimers can be Formed by Dewetting Half-Shells of Gold Deposited on the Surfaces of Spherical Oxide Colloids", J. Am. Chem. Soc., 125, pp. 12724-12725, 2003.

Wu, et al., "Direct Observation of Vapor-Liquid-Solid Nanowire Growth", J. Am. Chem. Soc., 123, pp. 3165-3166, 2001.

Bao, et al., "Toward Controllable Self-Assembly of Microstructures: Selective Functionalization and Fabrication of Patterned Spheres", Chem. Mater., 14 pp. 24-26, 2002.

Love, et al., "Fabrication and Wetting Properties of Metallic Half-Shells with Submicron Diameters", Nano Letters, vol. 2, No. 8, pp. 891-894, 2002.

Murray, et al., "Colloidal Synthesis of Nanocrystals and Nanocrystal Superlattices", IBM J. Res. & Dev., vol. 45, No. 1, pp. 47-56, Jan. 2001.

Chen, et al., "Gold-Coated Iron Nanoparticles for Biomedical Applications", Journal of Applied Physics, vol. 93, No. 10, pp. 7551-7553, May 15, 2003.

Gu, et al., "Facile One-Pot Synthesis of Bifunctional Heterodimers of Nanoparticles: A Conjugate of Quantum Dot and Magnetic Nanoparticles", J. Am. Chem. Soc., 126, pp. 5664-5665, 2004.

Mokari, et al., "Selective Growth of Metal Tips onto Semiconductor Quantum Rods and Tetrapods", Science, vol. 304, pp. 1787-1790, Jun. 18, 2004.

Teranishi et al., "Nanoacorns: Anisotropically Phase-Segragated CoPd Sulfide Nanoparticles", J. Am. Chem. Soc., 2 pages, Apr. 26, 2004.

Baselt, et al., "A Biosensor Based on Magnetoresistance Technology", Biosensors & Bioelectronics, 13, pp. 731-739, 1998.

Miller, et al., "A DNA Array Sensor Utilizing Magnetic Microbeads and Magnetoelectronic Detection", Journal of Magnetism and Magnetic Materials, 225, pp. 138-144, 2001.

Li, et al., "Detection of Single Micron-Sized Magnetic Bead and Magnetic Nanoparticles Using Spin Valve Sensors for Biological Applications", Journal of Applied Physics, vol. 93, No. 10, pp. 7557-7559, May 15, 2003.

Ferreira, et al., "Biodetection Using Magnetically Labeled Biomolecules and Arrays of Spin Valve Sensors (Invited)", Journal of Applied Physics, vol. 93, No. 10, pp. 7281-7286, May 15, 2003.

Schotter, et al., "A Biochip Based on Magnetoresistive Sensors", IEEE Transactions on Magnetics, vol. 38, No. 5, pp. 3365-3367, Sep. 2002.

Gu, et al. "Using Biofunctional Magnetic Nanoparticles to Capture Gram-Negative Bacteria at an Ultra-Low Concentration", Chem. Commun., pp. 1966-1967, 2003.

Taton, et al., "Two-Color Labeling of Oligonucleotide Arrays Via Size-Selective Scattering of Nanoparticle Probes", J. Am. Chem. Soc., 123, pp. 5164-5165, 2001.

Cao, et al., "DNA-Modified Core-Shell Ag/Au Nanoparticles", J. Am. Chem. Soc., 123, pp. 7961-7962, 2001.

Storhoff, et al., "One-Pot Colorimetric Differentiation of Polynucleotides with Single Base Imperfections Using Gold Nanoparticle Probes", J. Am. Chem. Soc., 120, pp. 1959-1964, 1998.

Taton, et al., "Scanometric DNA Array Detection With Nanoparticle Probes", Science, vol. 289, pp. 1757-1760, Sep. 8, 2000.

* cited by examiner

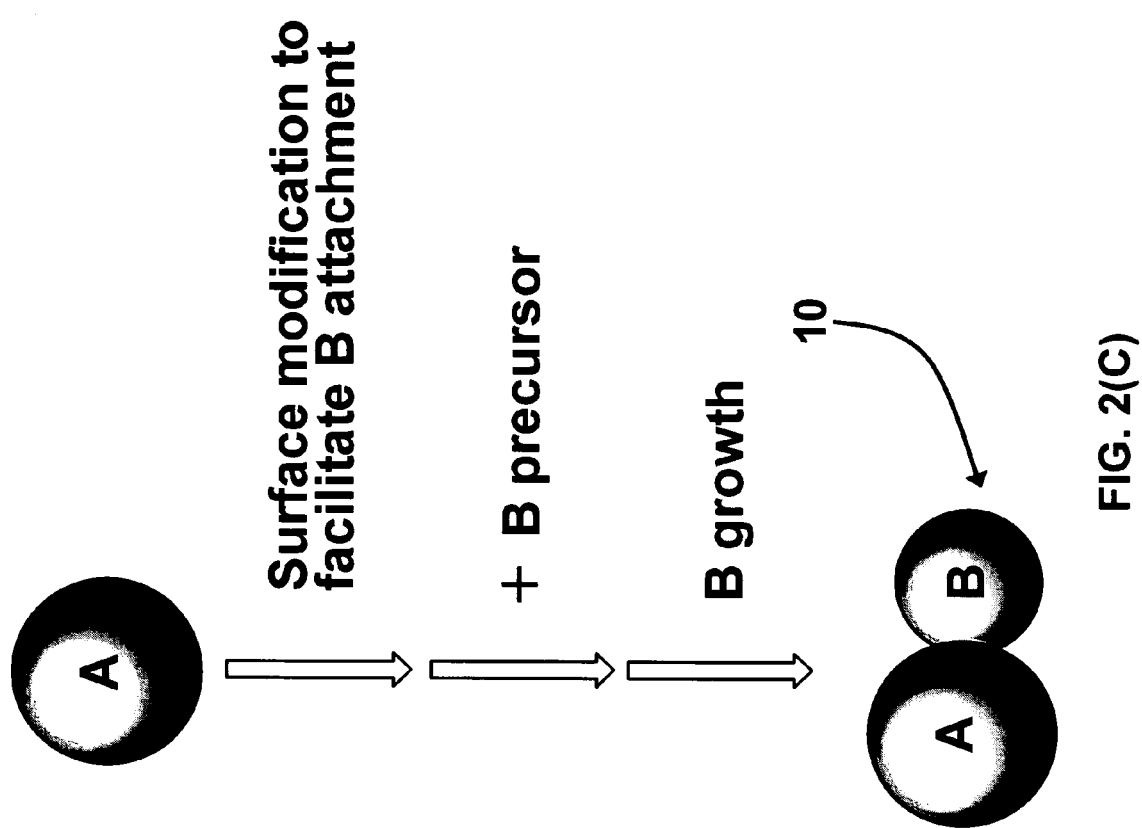

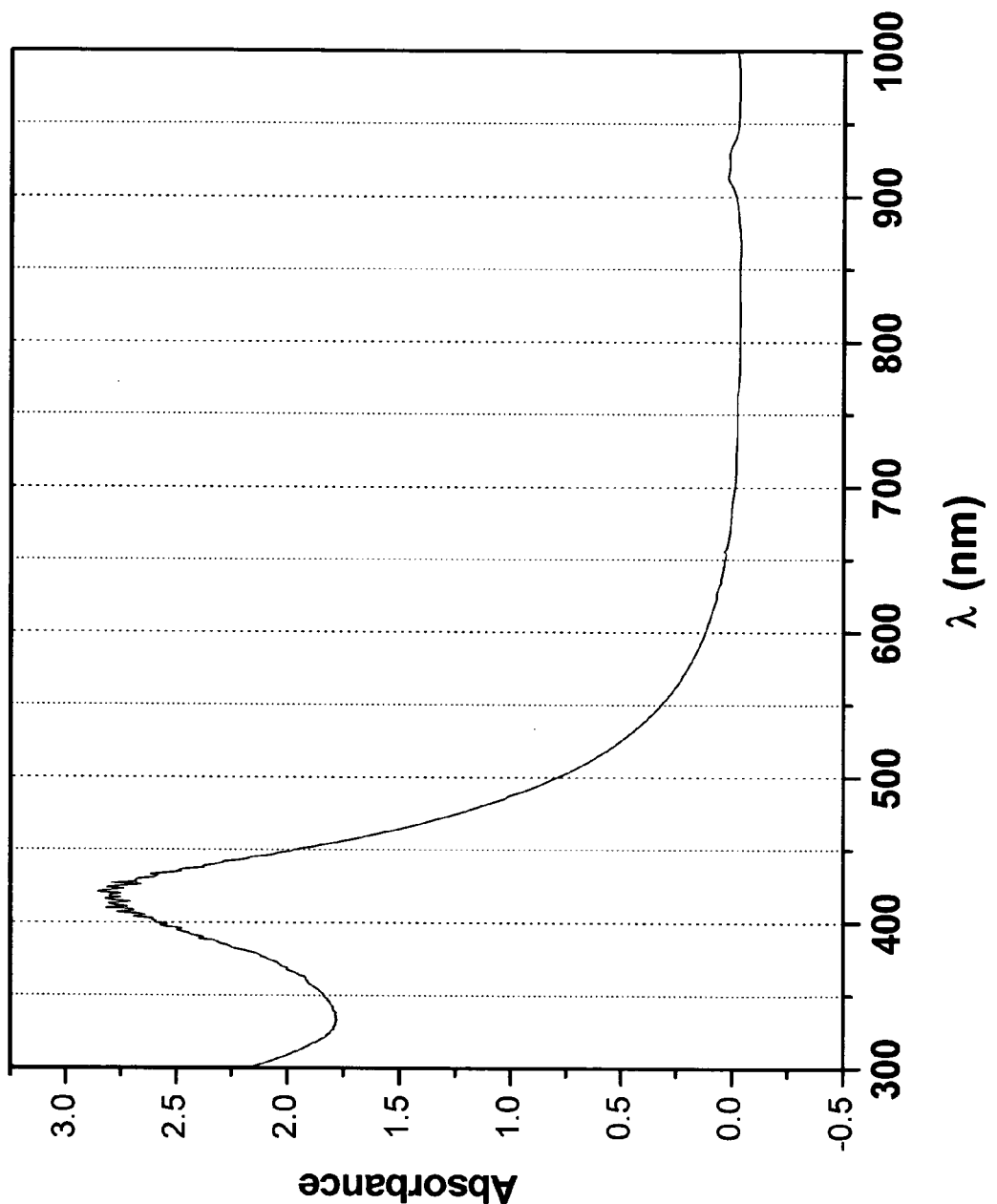

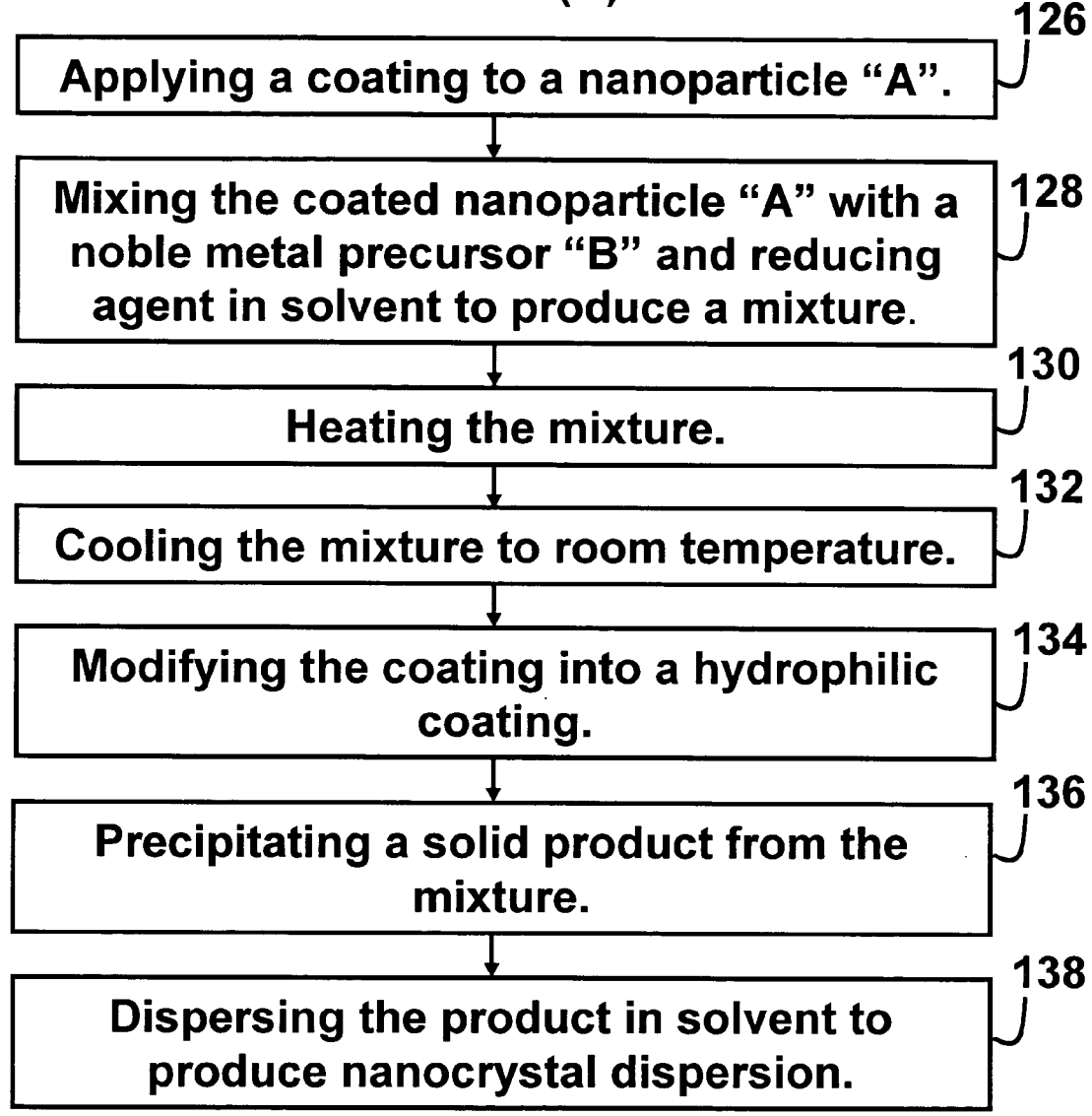

DUMBBELL-LIKE NANOPARTICLES AND A PROCESS OF FORMING THE SAME

GOVERNMENT INTEREST

The invention was at least partially funded under Defense Advanced Research Projects Agency (DARPA) Contract No. N00014-01-1-0885, and the U.S. Government has at least some rights in this invention.

BACKGROUND OF THE INVENTION

1. Field of the Invention

The embodiments of this invention generally relate to the synthesis of nanoscale objects, and more particularly to the synthesis of nanoparticles.

2. Description of the Related Art

Nanoscale objects with size of several hundred nanometers or less have promising potential in optic, electronic, magnetic, and catalytic applications. Progression in the production of monodisperse noble metal (Au, Ag, Pt and Pd), semiconducting, and magnetic nanoparticles has provided various systems suitable for nanooptic, nanoelectronic and nanomagnetic studies in mapping the scaling limits of future information technology, understanding spin-dependent transport phenomena, and using nanoparticles as highly sensitive labels (both magnetic and optic) for bio-recognition.

U.S. Pat. Nos. 6,123,920 and 6,203,777, the complete disclosures of which, in their entireties, are herein incorporated by reference, have suggested that nanoparticles with diameters smaller than 20 nm are ideal for biomedical applications. These small nanoparticles can in principle allow only one or several biomolecules, especially DNA strands, to attach and may be used as easily identified labels for future highly sensitive biomolecule separation and detection. Additionally, noble metal nanoparticles, especially Au nanoparticles, can be used for site-specific attachment of biomolecules, such as DNA strands, by using the high affinity of Au to a thiol group (SH). Furthermore, Au nanoparticles in a variety of size ranges have been synthesized and used for thiol-terminated biomolecule attachment, facilitating optic detection of the biomolecule via surface plasmon property of the Au nanoparticles. An alternative, yet a potentially more sensitive, approach involves using magnetic nanoparticles as tagging labels. The tagged biomolecules can be enriched, separated, or detected magnetically.

One recent research push has been in making nanoparticle labels with core/shell type structure with the core being a magnet and the shell being Au as described by Lin, J. et al, "Gold-Coated Iron (Fe@Au) Nanoparticles: Synthesis, Characterization, and Magnetic Field-Induced Self-Assembly," J. Solid State Chem., 159, 26 (2001) and Chen, M. et al, "Gold-coated Iron Nanoparticles for Biomedical Applications," J. Appl. Phys., Vol. 93, No. 10, 7551 (2003), the complete disclosures of which, in their entireties, are herein incorporated by reference. However, the evidence for Au coating over a magnetic nanoparticle has been inconclusive thus far.

While the conventional structures have provided particle-metal half shell structures via deposition of a thin metal film onto a spherical inorganic/organic polymeric particle, the conventional structures are generally much larger than 30 nm, making them unsuitable for biomedical applications. Moreover, a chemical solution phase has been used to form a structure containing FePt—CdS, CdSe—Au and PdS—CoS. However, there continues to remain a need for the preparation of novel dumbbell-like nanostructures with controlled functionality, which can be used for various nanoelectronic and nanomagnetic applications including various biomedical applications.

SUMMARY OF THE INVENTION

In view of the foregoing, an embodiment of the invention provides general techniques for making various types of water-soluble dumbbell-like nanoparticles having a portion comprising a magnetic identity including any of a metal, alloy and metal oxide, and a semiconductor, with another portion comprising a noble metal including any of Au, Ag, Pd, and Pt, whereby the dumbbell-like nanoparticles are capable of being implemented in biomedical and nanodevice applications.

An aspect of the invention provides a process of making nanoparticles, wherein the process comprises forming a mixture of a nanoparticle with a precursor in a first solvent, wherein the nanoparticle comprises a hydrophobic outer coating; heating the mixture; cooling the mixture to room temperature; modifying the hydrophobic outer coating into a hydrophilic outer coating; precipitating a solid product from the mixture, and dispersing the product in a second solvent. The nanoparticles comprise any of dumbbell-shaped nanoparticles and flower-shaped nanoparticles. Additionally, the nanoparticles comprise any of a semiconducting, magnetic, and noble metallic material, wherein the nanoparticles comprise a first portion comprising any of PbSe, PbS, CdSe, CdS, ZnS, Au, Ag, Pd, and Pt, and wherein the precursor comprises any of a cationic, neutral or particulate Au, Ag, Pd, Pt, or transition metal (Fe, Co, Ni) precursors of $Fe(CO)_5$, $Co(CO)_8$, $Ni(CO)_4$ or their analogues. Also, the first and second solvents comprise any of alkanes, arenes, ethers, nitrites, ketones, and chlorinated hydrocarbons. Furthermore, the reaction temperature of the process of making nanoparticles is in a range of 0° C. to 350° C.

A further aspect of the invention provides a process of making dumbbell-shaped nanoparticles, wherein the process comprises mixing nanoparticles with a noble metal precursor and a reducing agent in solvent, wherein each of the nanoparticles comprises a hydrophobic outer coating; heating the mixture; cooling the mixture to room temperature; modifying the hydrophobic outer coating into a hydrophilic outer coating; precipitating product from the mixture; and dispersing the product in solvent to produce nanoparticle dispersion. The nanoparticles comprise any of metal, alloy, oxide, and sulfide. The noble metal precursor comprises any of a cation or metal, and nanoparticles comprising any of Au, Ag, Pd, and Pt. The reducing agent comprises any of an amine, alcohol, aldehyde, hydride, and a metallic reducing agent. The solvent comprises any of alkanes, arenes, ethers, nitrites, ketones, and chlorinated hydrocarbons.

Another embodiment of the invention provides a process of making dumbbell-shaped nanoparticles, wherein the process comprises applying a coating to a nanoparticle; mixing the coated nanoparticle with a noble metal precursor and reducing agent in solvent to produce a mixture; heating the mixture; cooling the mixture to room temperature; modifying the coating into a hydrophilic coating; precipitating product from the mixture; and dispersing the product in solvent to produce a nanocrystal dispersion. The coated material comprises any of sulfur-, selenium-, phosphorus-, and arsenic-inclusive materials. Additionally, the nanoparticles comprise any of a metal, alloy, oxide, and sulfide. The noble metal precursor comprises any of a cation, metal, and nanoparticles comprising any of Au, Ag, Pd, and Pt. The reducing agent comprises any of an amine, alcohol, aldehyde, hydride, and a metallic reducing agent. The solvent comprises any of alkanes, arenes, ethers, nitrites, ketones, and chlorinated hydrocarbons.

A further embodiment of the invention provides a process of making dumbbell-shaped nanoparticles water-soluble, wherein the process comprises combining a magnetic material with a metallic material to form a dumbbell-shaped nanoparticles; coating the nanoparticles with a hydrophobic outer layer; and modifying a hydrophobic outer layer of the nanoparticles into a hydrophilic outer layer, wherein the hydrophobic layer comprises any of hydrocarbons, ethers, and esters, and wherein the hydrophilic layer comprises any of polar functional groups of —OH, —COOH, —NH2, —CON—, —CN, and ionic groups. The step of modifying comprises forming a bilayer structure of the nanoparticle. Additionally, the step of modifying comprises using surfactant replacement to change the hydrophobic layer into the hydrophilic layer. Moreover, the step of modifying is performed in a temperature ranging from room temperature to 150° C.

The dumbbell-like nanoparticles provided by the embodiments of the invention have numerous advantages over currently used nanoparticle systems. They can be made easily from solution phase synthesis. The size of any one part in the dumbbell structure can be tuned. The structure has small noble metal surface from a dot of less than 5 nm for site-specific binding of a single or, at most, a few biomolecules. The structure also has size-tunable magnetic or semiconducting dot from which an optimum magnetic or optic signal can be generated and detected. Further, such dumbbell structure may be used to connect two narrowly separated electrodes to form a nano-contact between two electrodes, a key step for future fabrication of spintronic devices.

Generally, the embodiments of the invention provide a process of forming dumbbell-shaped nanoparticles by mixing noble metal nanoparticles with a magnetic nanoparticle precursor. In other words, the embodiments of the invention provide a colloidal nanoparticle comprising a magnetic portion; a metallic portion adjacent to the magnetic portion; and a modifiable hydrophobic outer layer over the magnetic portion and the metallic portion, wherein the modifiable hydrophobic outer layer is adapted to be transformed into a hydrophilic outer layer, and wherein each of the magnetic and metallic portions comprise surfaces adapted to be modified. Moreover, the magnetic portion and the metallic portion are arranged in a dumbbell-like configuration or flower-like configuration.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 2(C) illustrates a technique for making a two-part dumbbell-like nanoparticle according to a third embodiment of the invention;

FIG. 14(A) is a graphical illustration of a UV-Vis spectrum of $Fe_3O_4$/FeS—Ag nanoparticles in hexane according to an embodiment of the invention;

FIG. 16(C) is a flow diagram illustrating a preferred method according to a third embodiment of the invention.

DETAILED DESCRIPTION OF PREFERRED EMBODIMENTS OF THE INVENTION

Figure 1:
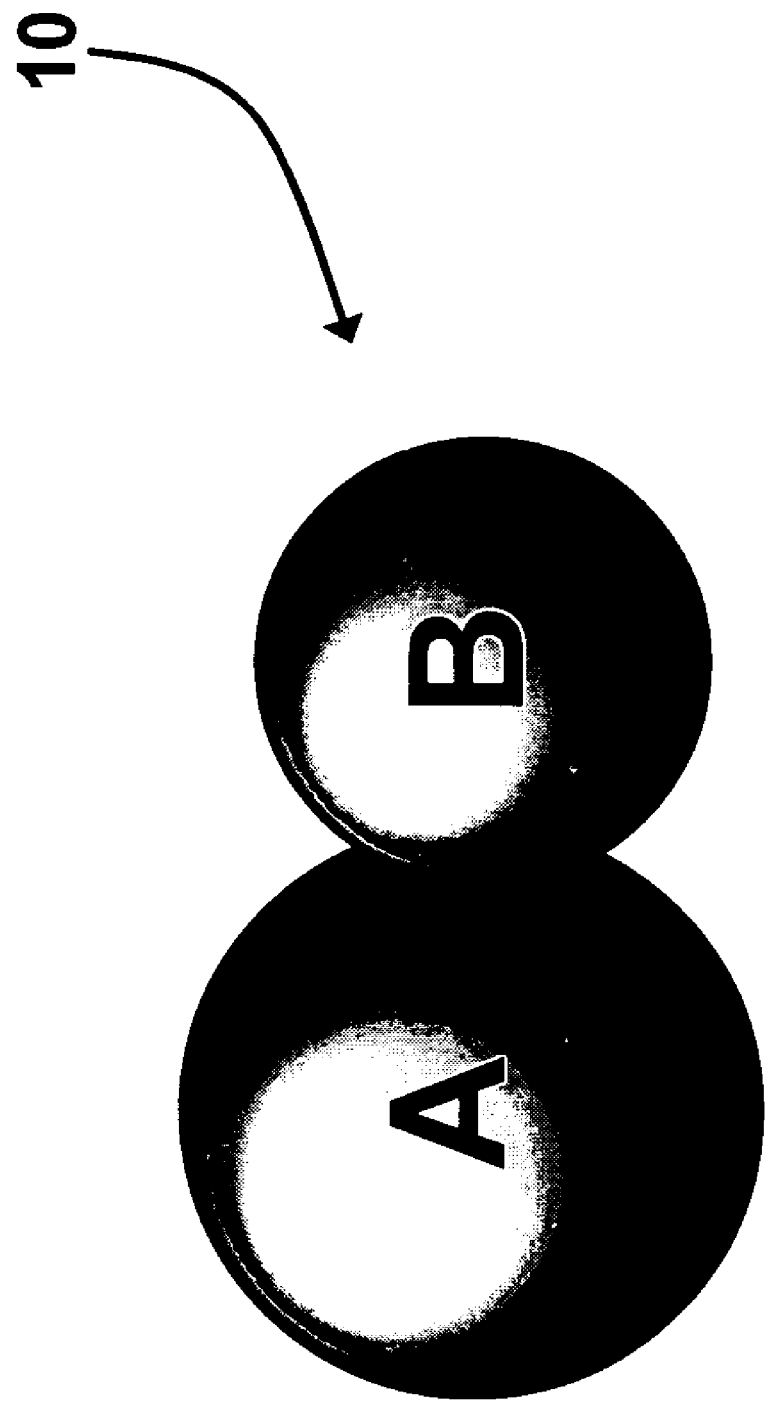
FIG. 1 is a schematic diagram of a dumbbell-like nanoparticle according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel nanostructure which can be used for various nanoelectronic and nanomagnetic applications including various biomedical applications. Referring now to the drawings, and more particularly to FIGS. 1 through 16(C), there are shown preferred embodiments of the invention.

FIG. 1 illustrates a dumbbell-like nanoparticle structure 10 (e.g., a multi-sphere structure having at least two spheres joined together) having at least a dual functionality with "A" illustrating a portion being a magnetic, semiconducting, or metallic unit and "B" illustrating a portion being a noble metal and different from "A". As noble metal has a high affinity to sulfur (S), for example, it will allow site-specific attachment of a thiol molecule to it, leaving the magnetic or semiconducting part (portion "A") for magnetic or optic detection. Further, noble metal Ag and Au have strong surface plasmon. As such, the presence of a Ag or Au small sphere ("B") in the dumbbell structure 10 will also facilitate the structure to be used for optic detection. Both portions "A" and "B" can be any of an elemental metal, alloy, metal oxide, metal sulfide, metal selenide, and polymers with a size tunable from 2 nm to 20 nm.

The basic chemistry for the formation of the dumbbell structure 10 involves the noble metal attachment to the previously formed particle surface that includes an element for noble metal attachment. Sulfur (S) and Selenium (Se) are preferably used to form a strong chemical bond with the noble metal, such as Gold (Au) or Silver (Ag). Thus, either metal sulfide (MS) nanoparticles or metal selenide (MSe) nanoparticles can offer the surface containing the S element and Se element, facilitating Au or Ag attachment. For nanoparticles without an S or Se element on the surface, they may be coated with a layer of metal sulfide or metal selenide. By carefully modifying the surface properties, various dumbbell-like nanostructures can be made in accordance with the embodiments of the invention.

Figure 2B:
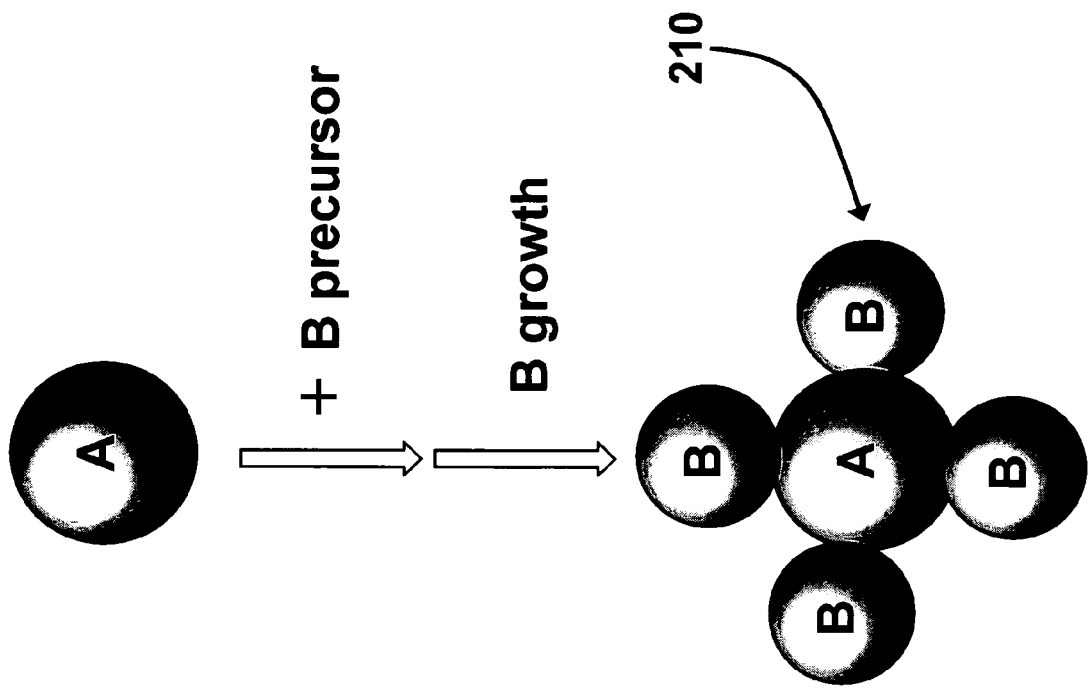
FIG. 2(B) illustrates a technique for making a two-part dumbbell-like nanoparticle according to a second embodiment of the invention.
Figure 2A:
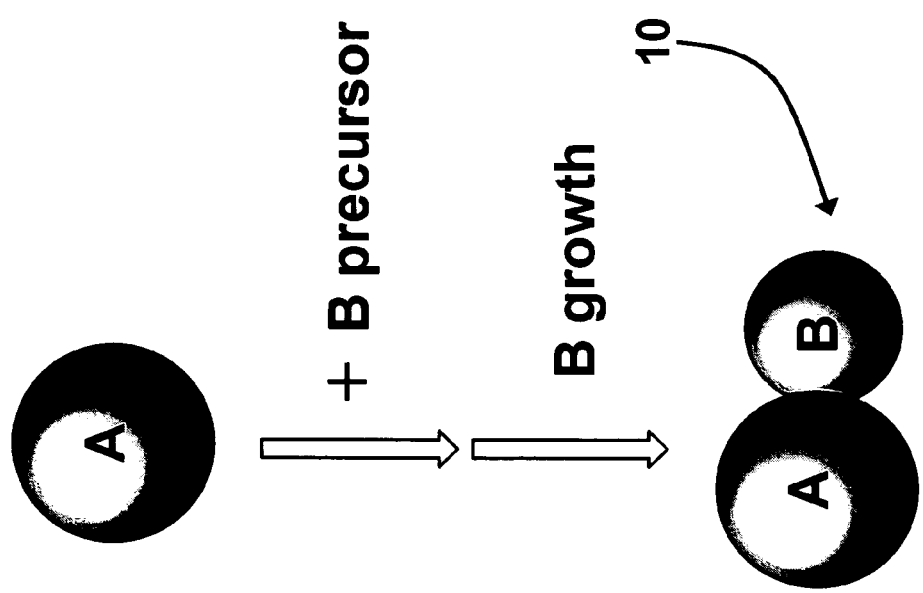
FIG. 2(A) illustrates a technique for making a two-part dumbbell-like nanoparticle according to a first embodiment of the invention.

FIGS. 2(A) through 2(C) illustrate three techniques for A-B nanoparticle synthesis. In scheme 1, shown in FIG. 2(A), "A" nanoparticles are directly mixed with a "B" precursor. Reduction or decomposition of the "B" precursor will allow "B" to attach to the particle surface forming dumbbell nanoparticles 10. In scheme 2, shown in FIG. 2(B), several "B" particles are shown attaching to portion "A" thereby producing flower-like nanoparticles 210. In scheme 3, shown in FIG. 2(C), "A" nanoparticles are shown not having a proper surface chemistry for "B" attachment. However, with a proper surface treatment, mixing the "B" precursor with the particles will lead to a proper mixture of "A" particles and "B" particles. The surface treatment may include a thin coating such as metal sulfide or metal selenide, which is suitable to metal attachment, leading to dumbbell-like nanoparticles 10.

Figure 3:
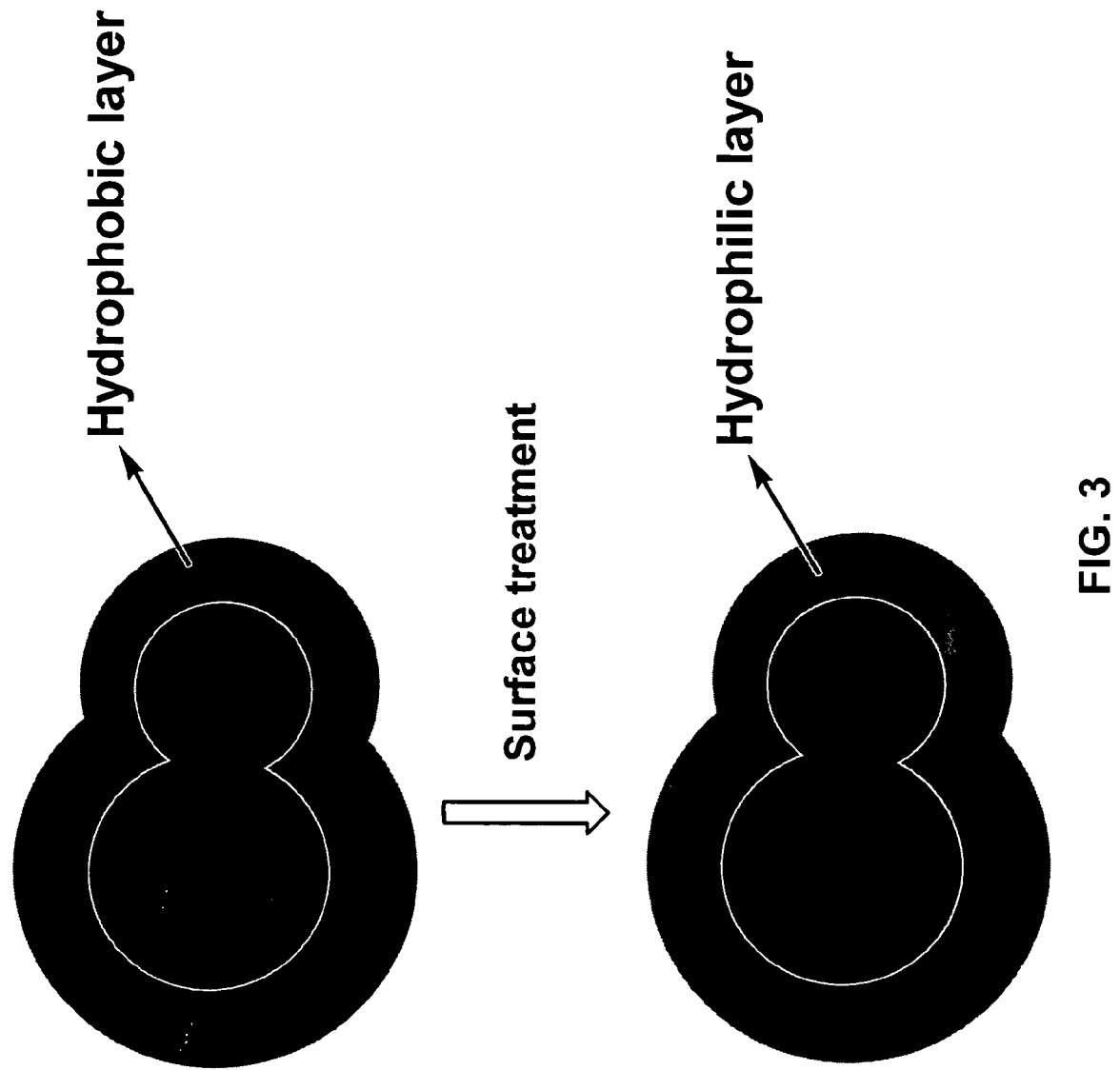
FIG. 3 is a schematic illustration of surfactant transformation of the dumbbell-like nanoparticles of FIG. 1 from a hydrophobic state to a hydrophilic state according to an embodiment of the invention.
Figure 4:
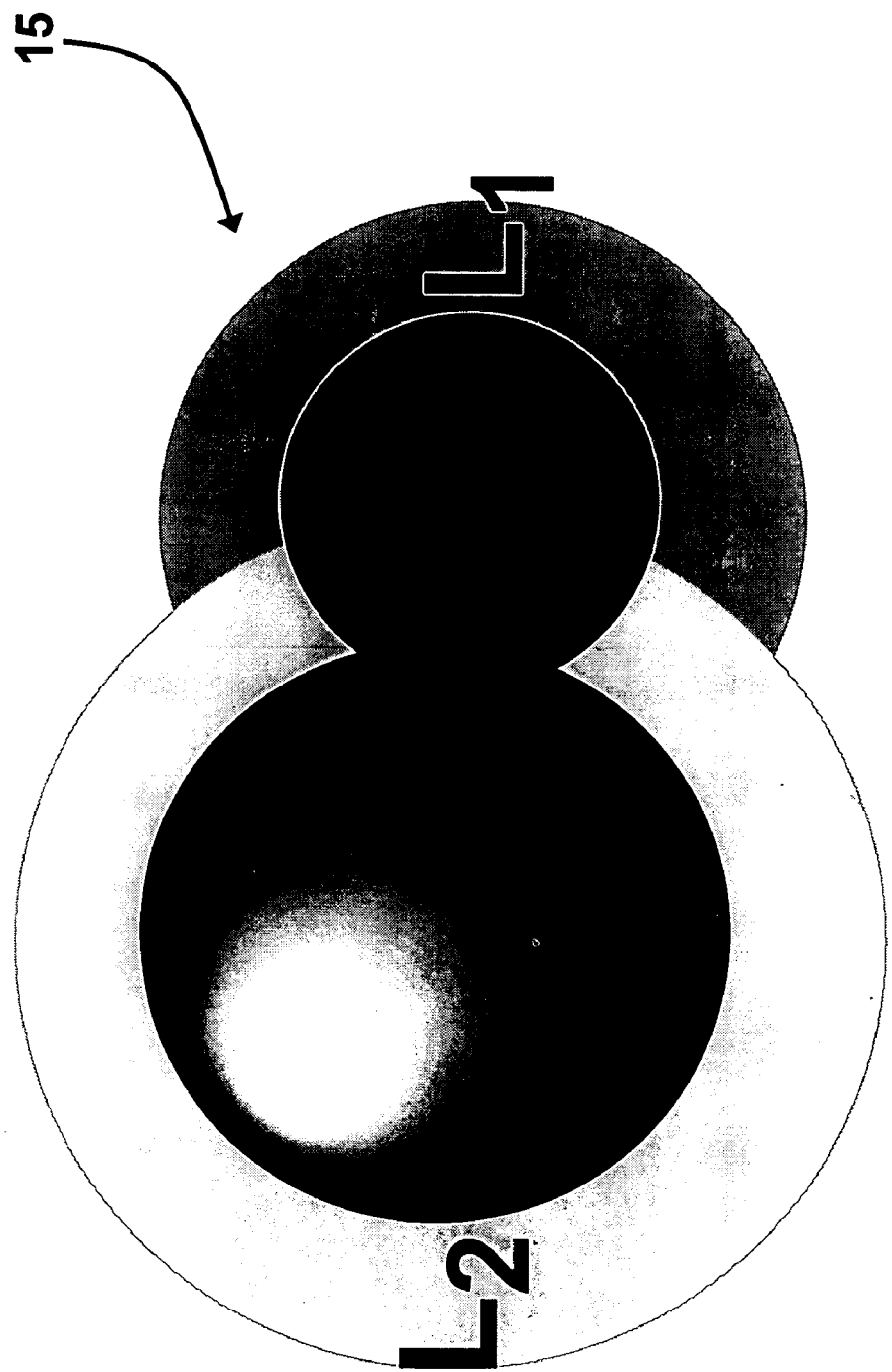
FIG. 4 is a schematic illustration of the dumbbell-like nanoparticles of FIG. 1 with a coating according to an embodiment of the invention.

In another embodiment, the dumbbell-like multi-functional nanoparticles 10 made from an organic solution phase are coated with a layer of hydrocarbon surfactant for nanoparticle stabilization in the solvent. This hydrocarbon coating makes the nanoparticles hydrophobic; i.e., they can only be dispersed in non-polar or weakly polar solvent such as alkane, benzene, toluene, and aromatic solvent. Moreover, the hydrophobic surfactant around each dumbbell nanoparticle can be replaced by a hydrophilic surfactant, resulting in water-soluble and biocompatible nanoparticles, which can be dispensed into a polar solvent such as ethanol, methanol, or water, for example, as shown in FIG. 3. Additionally, the noble metal can be used for site-specific attachment to bio-molecules as shown in FIG. 4 which illustrates dumbbell-like nanoparticle 15 with different coatings, "L1" and "L2".

Figure 5:
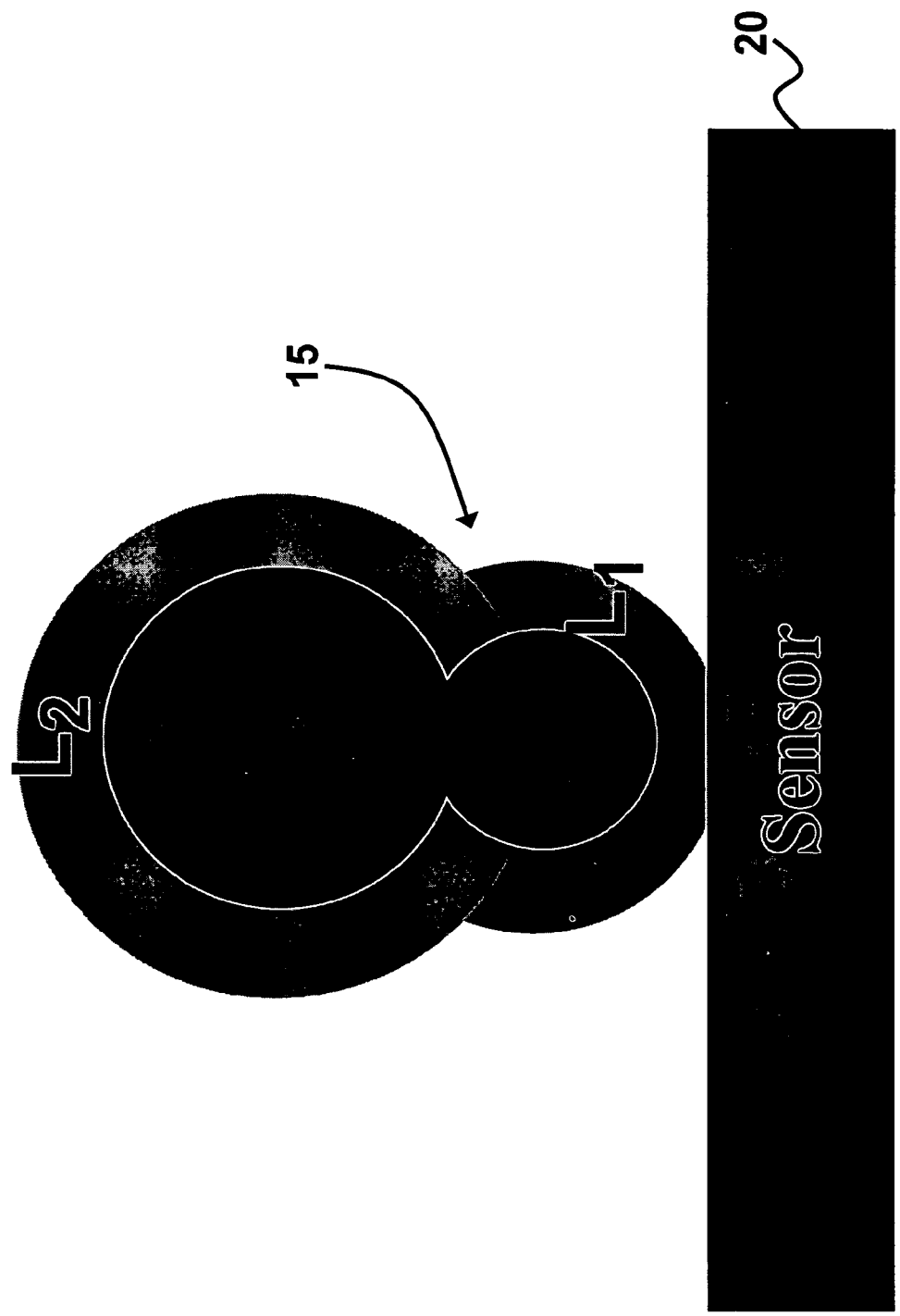
FIG. 5 is a schematic illustration of a dumbbell-like nanoparticle used as a label for biomolecule detection according to an embodiment of the invention.
Figure 6:
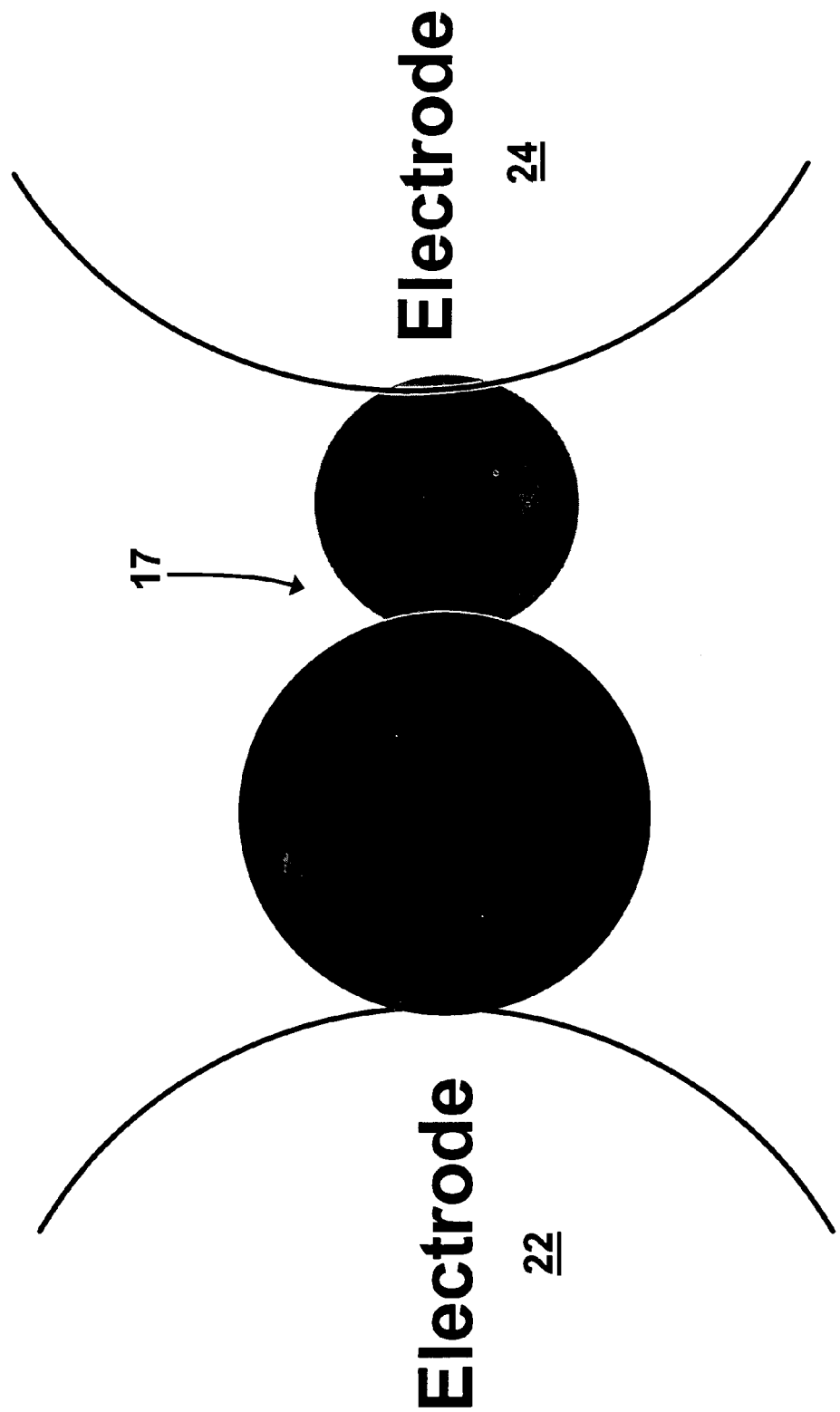
FIG. 6 is a schematic illustration of a dumbbell-like nanoparticle used as a bridge for nano-contact according to an embodiment of the invention.

This will allow nanoparticles 15 to attach to a magnetic sensor surface 20 for highly sensitive bio-recognition, as shown in FIG. 5, where "L1" is the biomolecule in interest and L2 can be any hydrophilic surfactant. For example, "L1" can be a two-strand DNA fragment or an antibody-antigen-antibody sandwich structure. Alternatively, the organic surfactant around each particle can be removed and the particle can be attached to a patterned electrode containing noble metal, such as gold. The presence of gold in a dumbbell nanoparticle will facilitate particle attachment to this electrode by gentle annealing it to allow an interface diffusion to occur between the gold sphere and the gold electrode. This aids in building a connection between two electrodes 22, 24 with only one particle 17, either a magnetic or semiconducting nanoparticle, as shown in FIG. 6, resulting in novel spintronic and single electron devices. For example, the magnetic nanoparticle could affect spin-dependent transport between the two electrodes (often made magnetic) 22, 24. In addition, the nanoparticles are configured sufficiently small such that the electronic transport between the two electrodes 22, 24 via the nanoparticles 17 becomes quantized because of Coulomb blockade. In other words, the nanoparticles can act as a "quantum dot" in single electronic devices.

Experimentally, semiconductor nanoparticles 10 have been constructed by attaching Au nanoparticles from an organic solution phase synthesis based on scheme 1 (FIG. 2(A)), or magnetic nanoparticles attached by Ag or Au nanoparticles based on Schemes 1-3 (FIGS. 2(A)-2(C)). PbSe nanoparticles may be synthesized using any known procedure such as that described in Murray, C. B. et al, "Colloidal Synthesis of Nanocrystals and Nanocrystal Superlattices," IBM J. Res. Dev., Vol. 45, No. 1, 47 (2001), the complete disclosure of which, in its entirety, is herein incorporated by reference. PbSe offers a surface that includes Se, facilitating Au attachment. Thus, mixing the PbSe particles with $HAuCl_4$ salt in the presence of oleylamine and stirring the mixture at 40° C. for 1 hour yields PbSe—Au dumbbell nanoparticles according to the embodiments of the invention.

Figure 8:
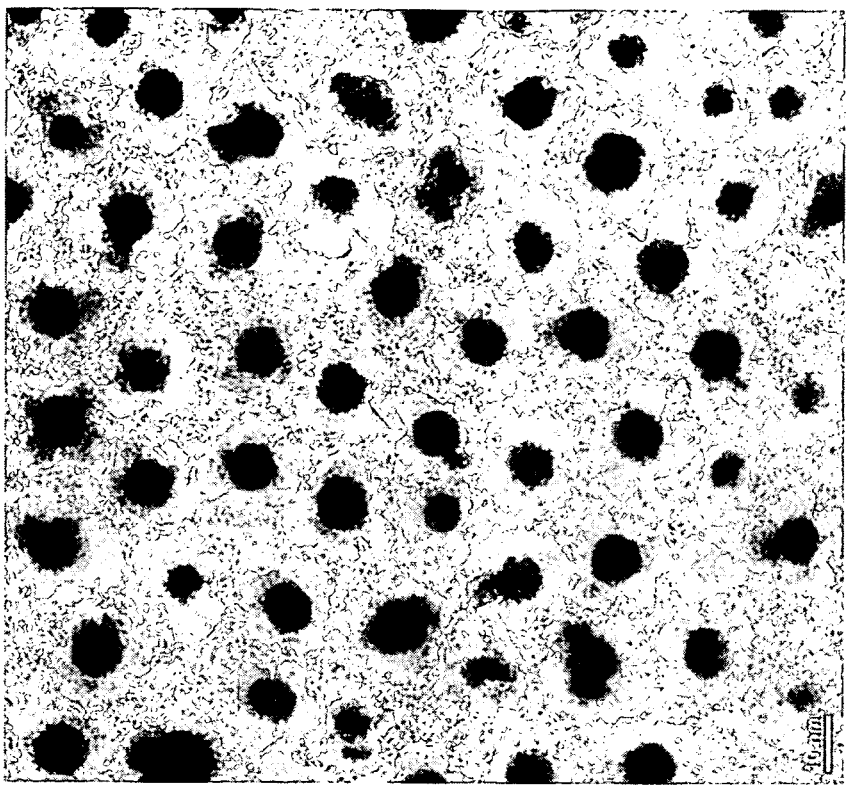
FIG. 8 is another TEM image of $Fe_2O_3$—Au nanoparticles, wherein the lighter part of the image represents $Fe_2O_3$ while the darker part of the image represents Au according to an embodiment of the invention.
Figure 7:
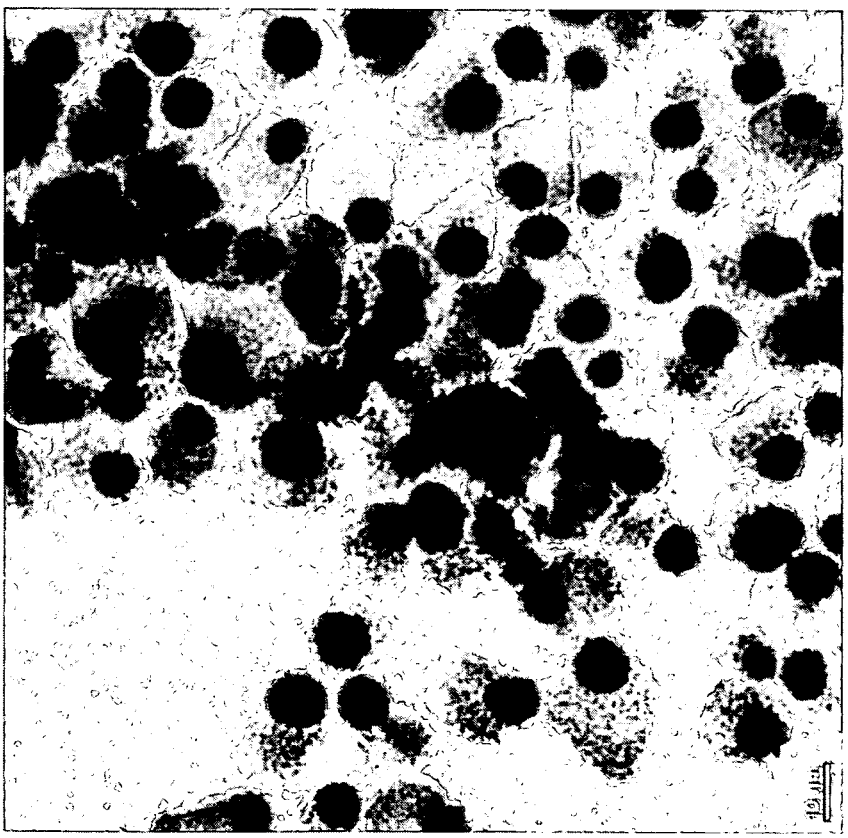
FIG. 7 is a TEM image of $Fe_2O_3$—Au nanoparticles, wherein the lighter part of the image represents $Fe_2O_3$ while the darker part of the image represents Au according to an embodiment of the invention.

The embodiments of the invention provide multi-shaped nanoparticles such as $Fe_2O_3$—Au dumbbell-like particles (shown in the TEM image of FIG. 7) and $Fe_2O_3$—Au flower-like nanoparticles (shown in the TEM image of FIG. 8), which can be made by decomposing $Fe(CO)_5$ over Au nanoparticles. In FIGS. 7 and 8, the lighter part of the image(s) corresponds with $Fe_2O_3$ while the darker part of the image(s) corresponds with Au.

Figure 9:
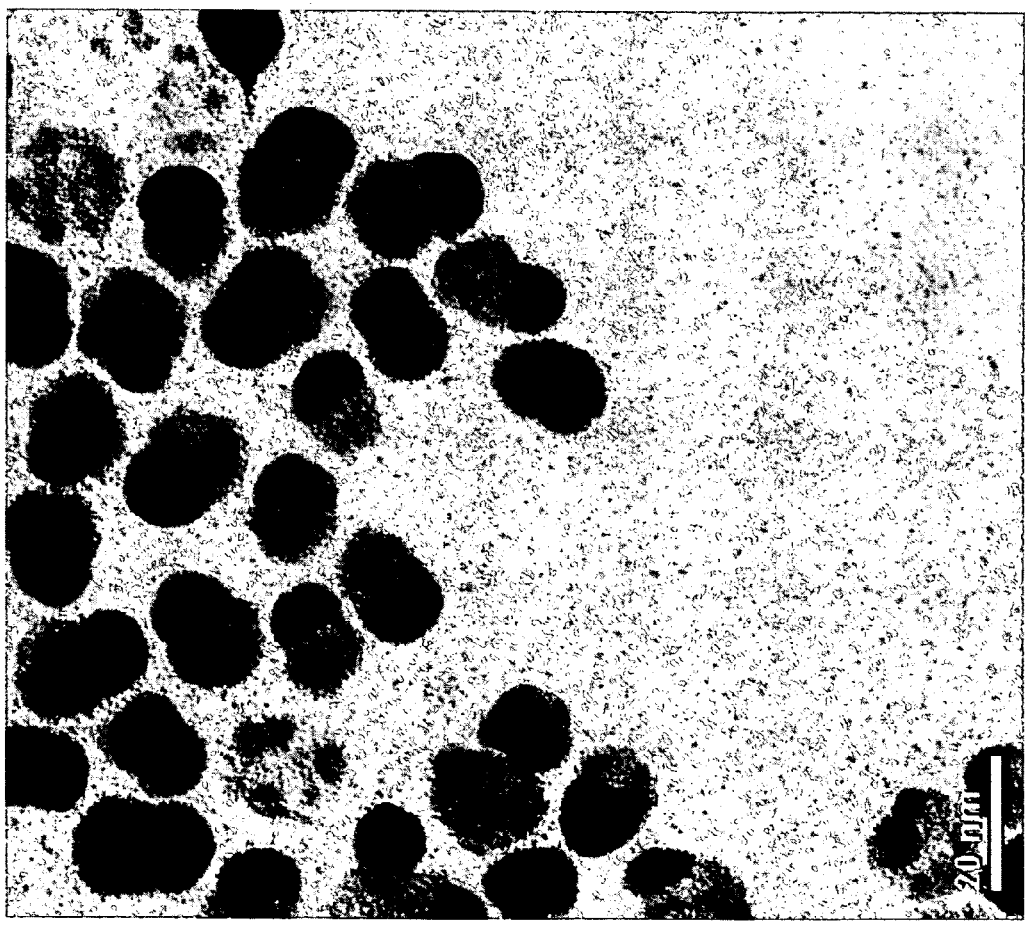
FIG. 9 is a TEM image of PbSe—Au nanoparticles, wherein the lighter part of the image represents PbSe while the darker part of the image represents Au according to an embodiment of the invention.
Figure 10:
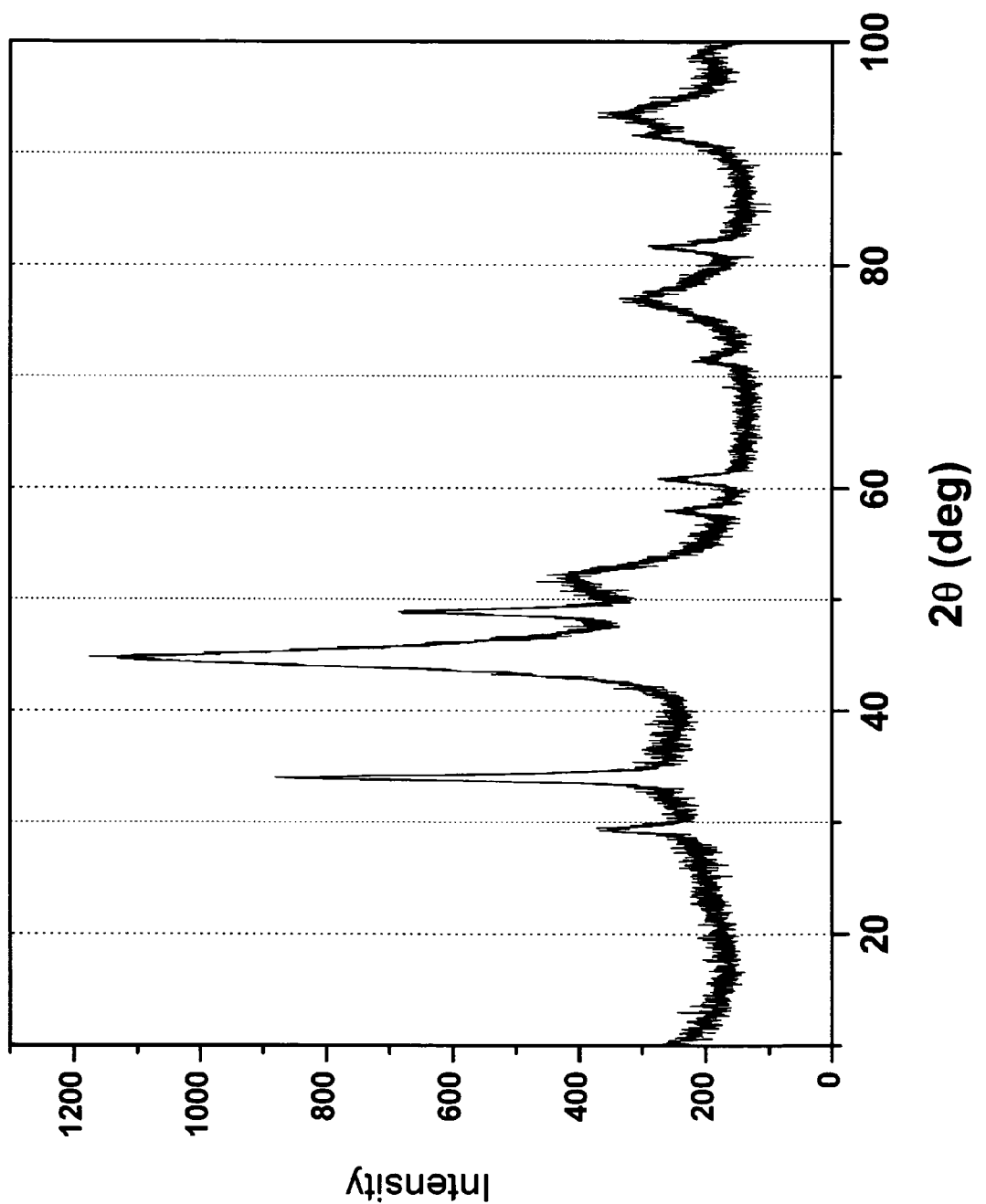
FIG. 10 is a graphical illustration of an X-ray diffraction pattern of an assembly of PbSe—Au nanoparticles according to an embodiment of the invention.
Figure 11:
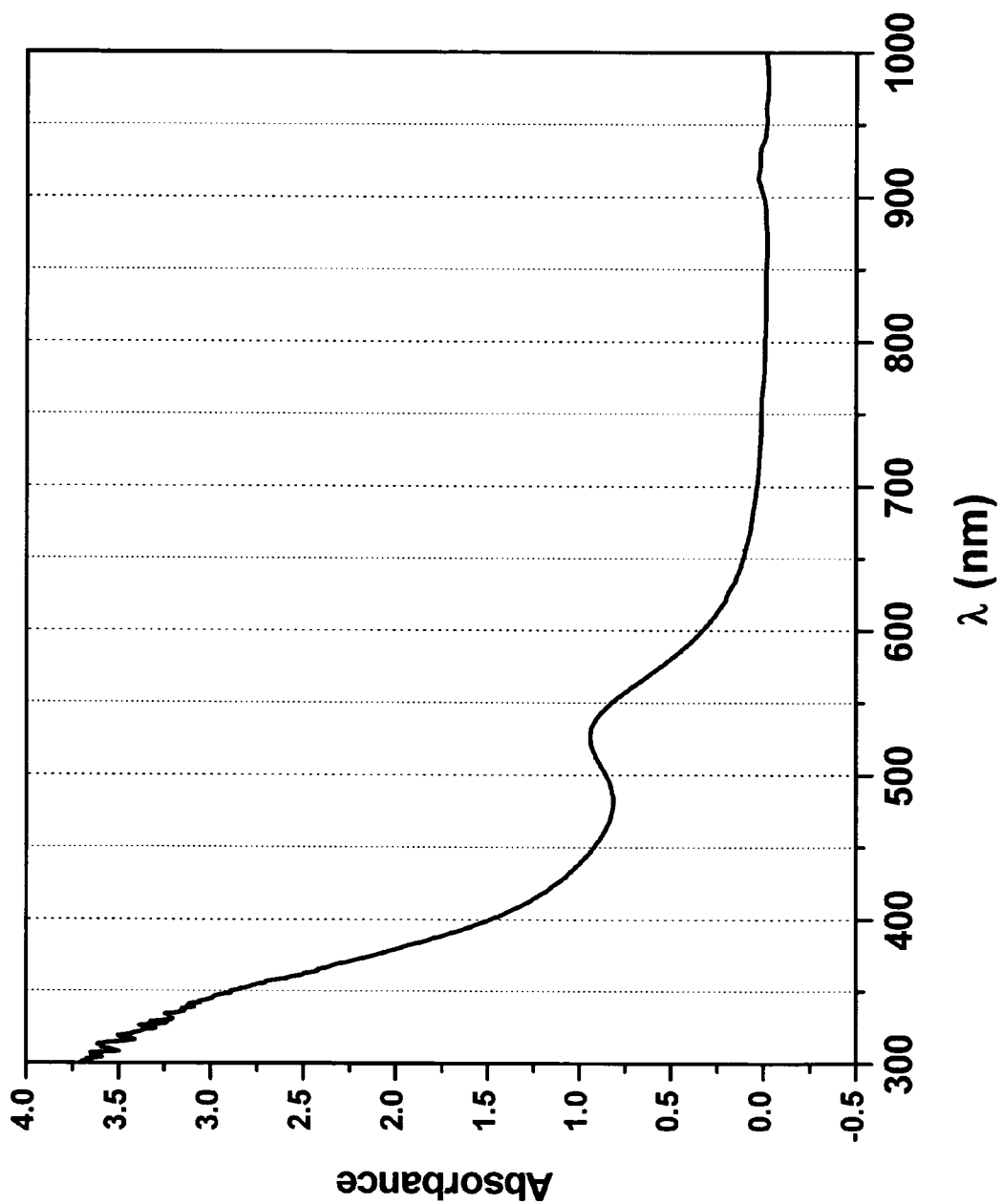
FIG. 11 is a graphical illustration of a UV-Vis spectrum of PbSe—Au nanoparticles in hexane according to an embodiment of the invention.

FIG. 9 is the TEM image of the PbSe—Au nanoparticles with the darker region of the image being Au and lighter region of the image one being PbSe. FIG. 10 illustrates the X-ray diffraction pattern of the dumbbell particles according to an embodiment of the invention. FIG. 10 shows two groups of peaks, one representative of PbSe nanoparticles, and another of Au nanoparticles. The pattern shown in FIG. 10 is based on samples that are deposited on a glass substrate from a hexane dispersion. The diffraction pattern shown in FIG. 10 was collected on a Simens D-500 diffractometer under Co K$\alpha$ radiation ($\lambda$=1.788965 Å). FIG. 11 illustrates the UV-Vis spectrum of the PbSe—Au nanoparticles in hexane. The local maxima (peak) at approximately 525 nm corresponds to the surface plasmon of Au, consistent with the spectra from the known Au nanoparticle dispersion.

To make $Fe_3O_4$/FeS—Ag dumbbell nanoparticles, iron oxide nanoparticles are constructed using any suitable method, such as that described in U.S. patent application Ser. No. 10/124,078, the complete disclosure of which, in its entirety, is herein incorporated by reference. Then, the oxide surface is modified with thiol. An HS-group can attach to the iron oxide surface at a high temperature. SH—Fe linkage decomposes to give a FeS species on the particle surface. The FeS modified $Fe_3O_4$ nanoparticles are then mixed with silver nitrate salt, which is dissolved in solvent tetralin in the presence of an alkylamine. By heating the mixture to 100° C. for 1 hour, dumbbell-like $Fe_3O_4$/FeS—Ag nanoparticles are synthesized.

Figure 12B:
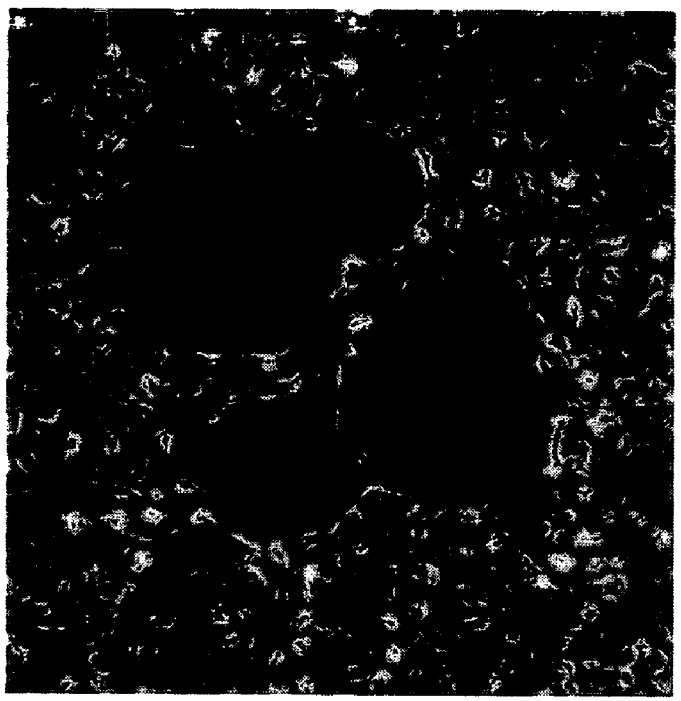
FIGS. 12(A) through 12(C) are TEM images of $Fe_3O_4$/FeS—Ag nanoparticles, wherein the larger and lighter dots represent $Fe_3O_4$ nanoparticles with their surface modified with FeS, and the smaller and darker dots represent Ag; with the image illustrated in FIG. 12(A) representing two dumbbell particles aligned in parallel; the image illustrated in FIG. 12(B) representing two dumbbell particles aligned in antiparallel; and the image illustrated in FIG. 12(C) representing an assembly of dumbbell nanoparticles according to an embodiment of the invention.
Figure 12A:
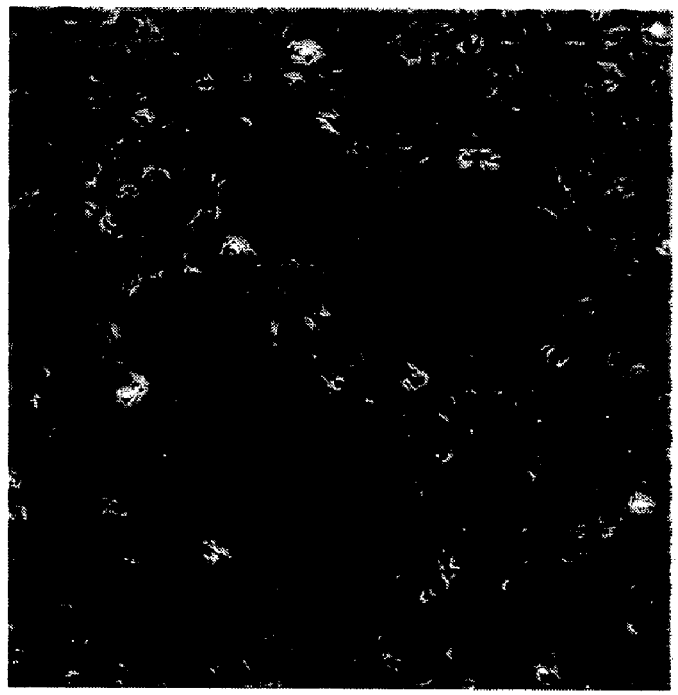
Figure 12C:
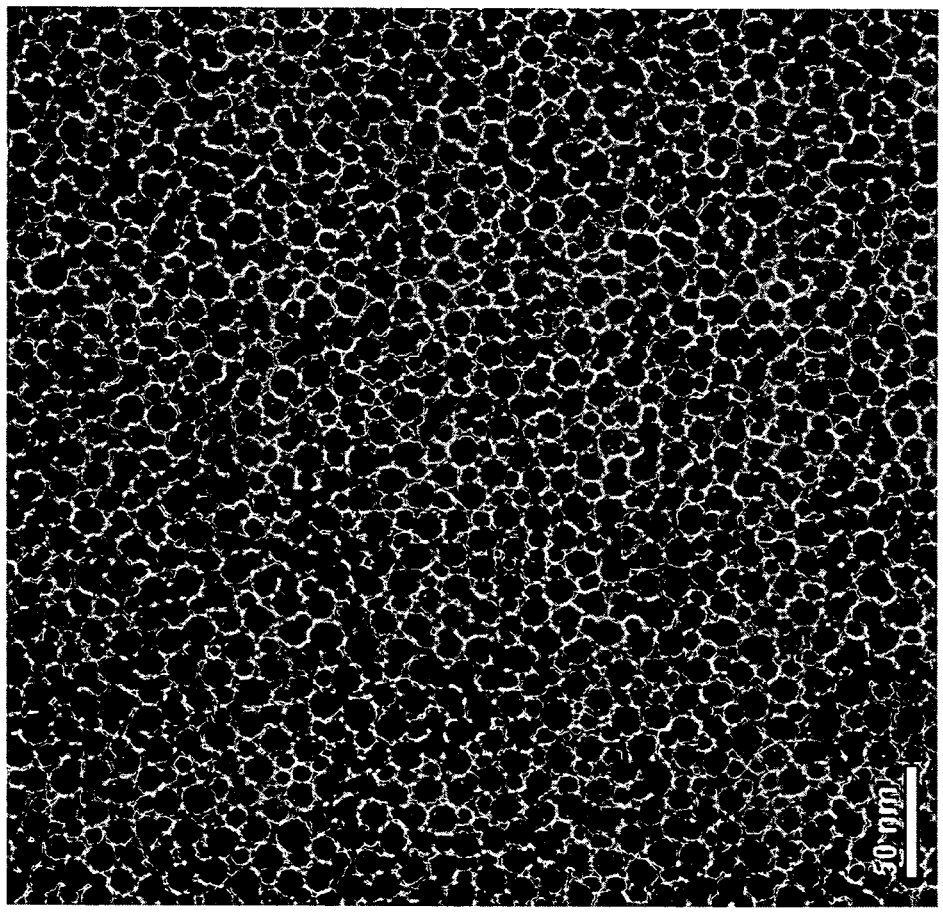

FIGS. 12(A) through 12(C) illustrate TEM images of $Fe_3O_4$/FeS—Ag nanoparticles. The black dots represent Ag nanoparticles while the lighter dots represent iron oxide nanoparticles. The size of each dot can be readily tuned by choosing the size of the oxide nanoparticles and by controlling the amount of silver salt added. The image depicted in FIG. 12(A) illustrates two dumbbell-like particles aligned in a parallel configuration according to an embodiment of the invention. The image depicted in FIG. 12(B) illustrates two dumbbell-like particles aligned in an anti-parallel configuration according to an embodiment of the invention. The image depicted in FIG. 12(C) illustrates an assembly of dumbbell-like nanoparticles according to the embodiments of the invention.

Figure 13:
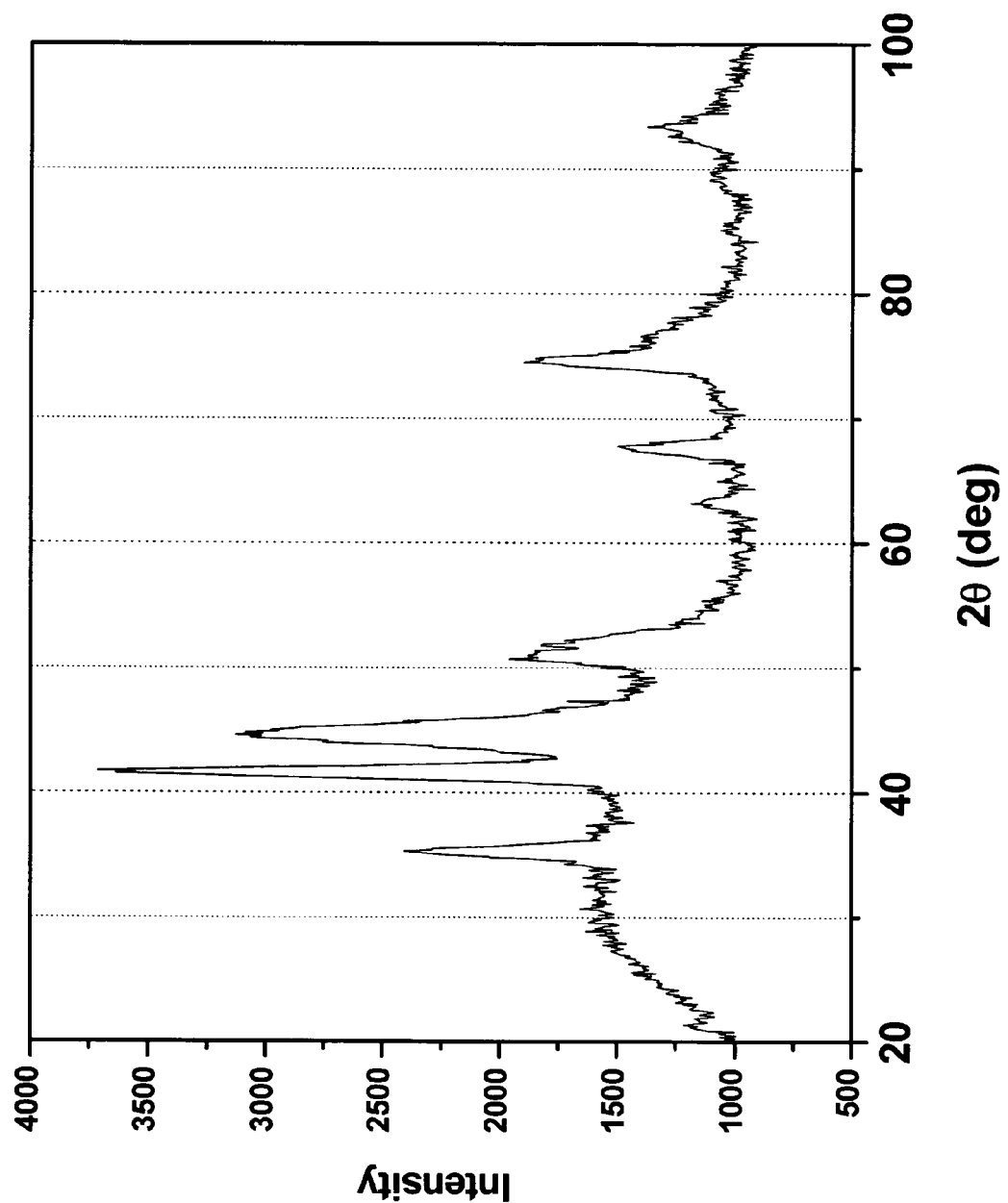
FIG. 13 is a graphical illustration of an X-ray diffraction pattern of $Fe_3O_4$/FeS—Ag nanoparticles according to an embodiment of the invention.

FIG. 13 illustrates an X-ray diffraction pattern of the dumbbell-like nanoparticles according to an embodiment of the invention. FIG. 13 shows two groups of particles with one consistent with spinel structured $Fe_3O_4$ and the other with fcc (face centered cubic) Ag. The coating of FeS over the $Fe_3O_4$ surface is too thin to be detected from X-ray diffraction. The pattern shown in FIG. 13 is based on samples that are deposited on a glass substrate from a hexane dispersion. The diffraction pattern shown in FIG. 13 was collected on a Simens D-500 diffractometer under Co K$\alpha$ radiation ($\lambda$=1.788965 Å).

As synthesized, the dumbbell-like nanoparticles, as produced according to the embodiments of the invention, are surrounded by a layer of hydrocarbon originated from oleic acid and an oleylamine. The presence of hydrocarbon makes the nanoparticles hydrophobic, dispersed only in non-polar or weakly polar solvent. By shaking a hexane dispersion of hydrophobic nanoparticles with an aqueous solution of $Et_4NOH$ and HS—$(CH_2)_{11}$—$COONEt_4$, the nanoparticles can be transformed in water. HS—$(CH_2)_{11}$—$COONEt_4$ replaces the long chain hydrocarbon surfactant around each particle and makes the particle hydrophilic and can be dispersed in various polar solvents, such as water and methanol. The nanoparticles in water can be precipitated out by adding acetone and can be separated using a magnet. The precipitate can then be washed with acetone, and re-dissolved with water, giving a clean water dispersion of the particles with a pH of approximately 7.

Figure 14B:
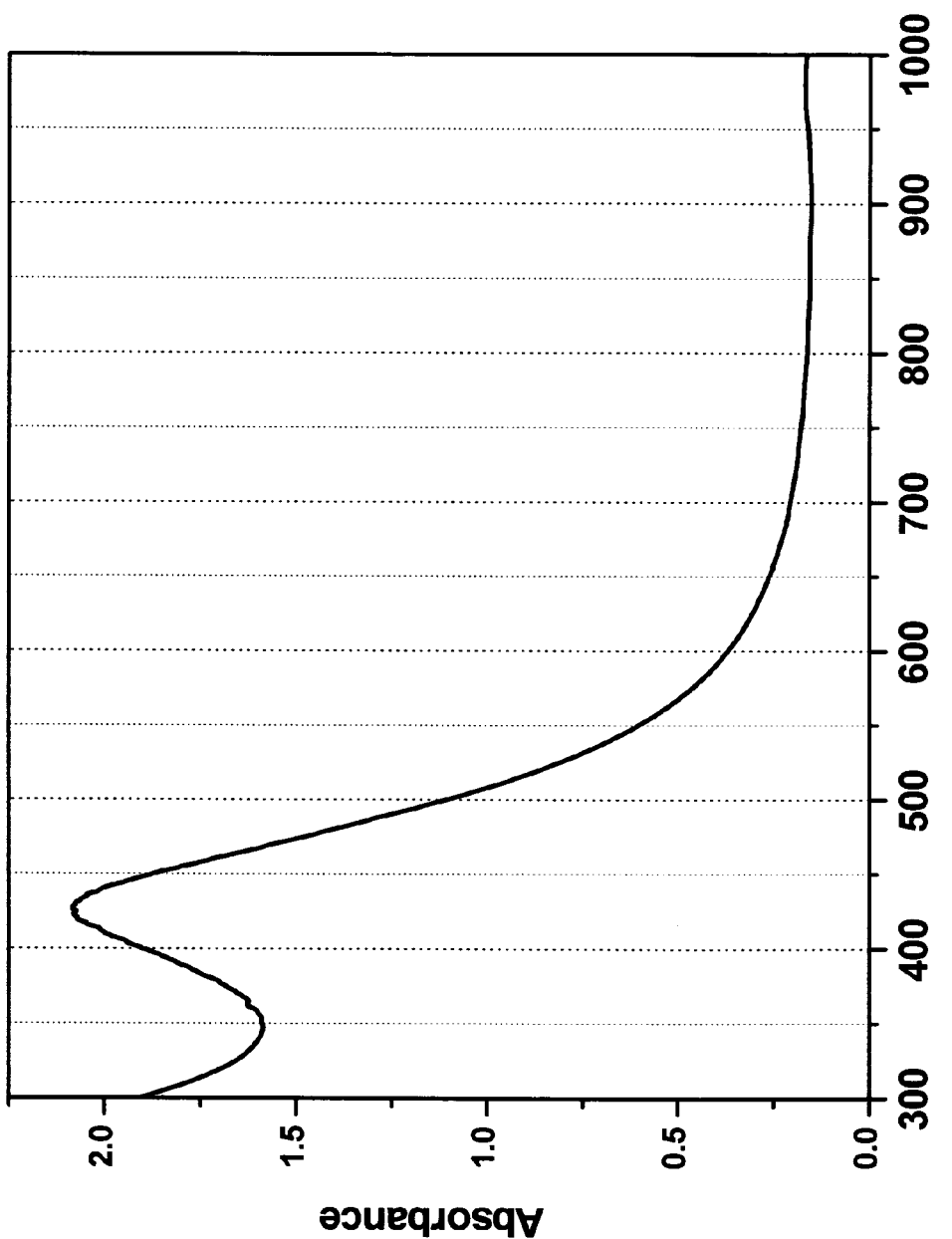
FIG. 14(B) is a graphical illustration of a UV-Vis spectrum of $Fe_3O_4$/FeS—Ag nanoparticles in water according to an embodiment of the invention.
Figure 15A:
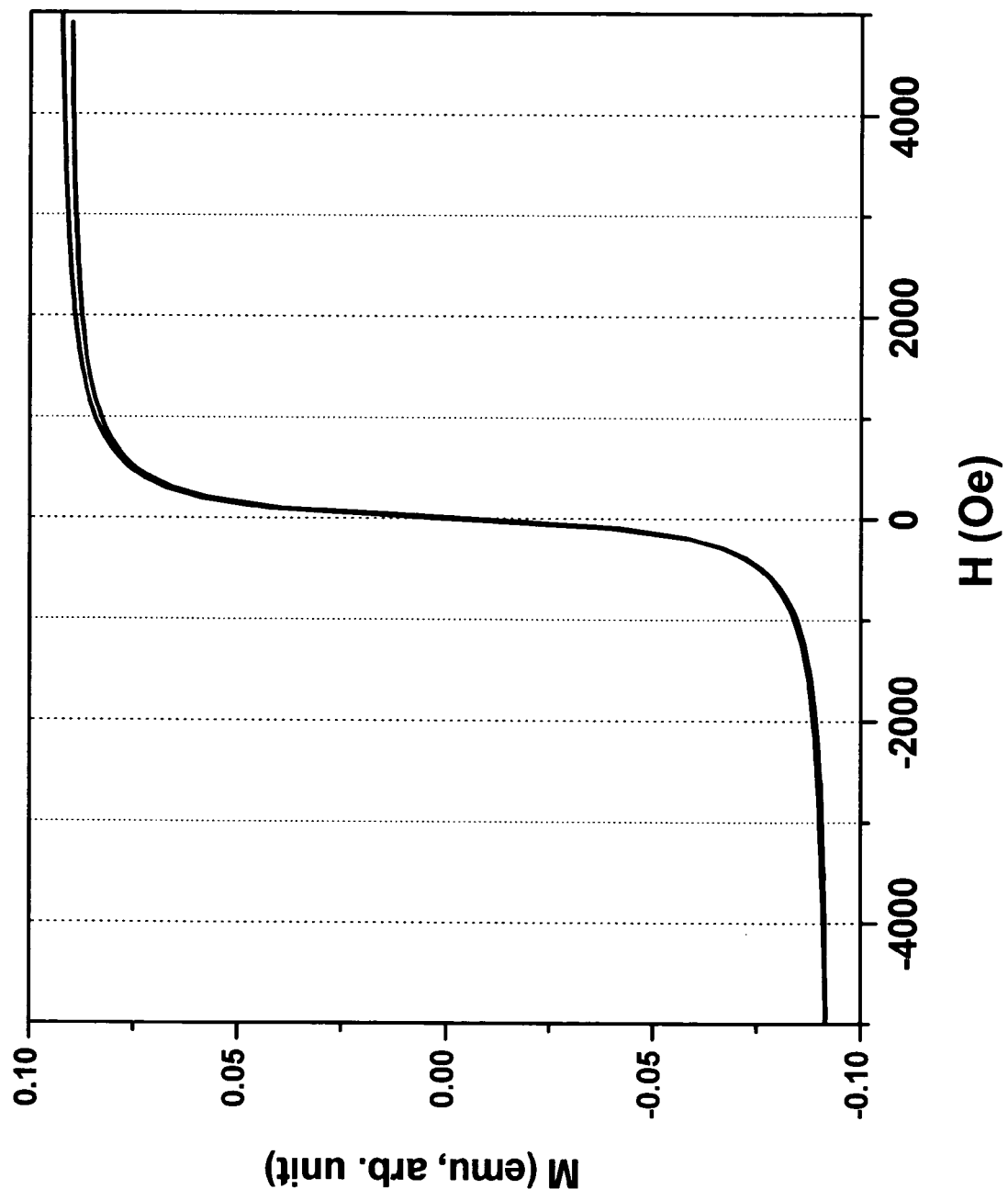
FIG. 15(A) is a graphical illustration of a VSM hysteresis loop of an assembly of $Fe_3O_4/FeS$—Ag nanoparticles according to an embodiment of the invention.
Figure 15B:
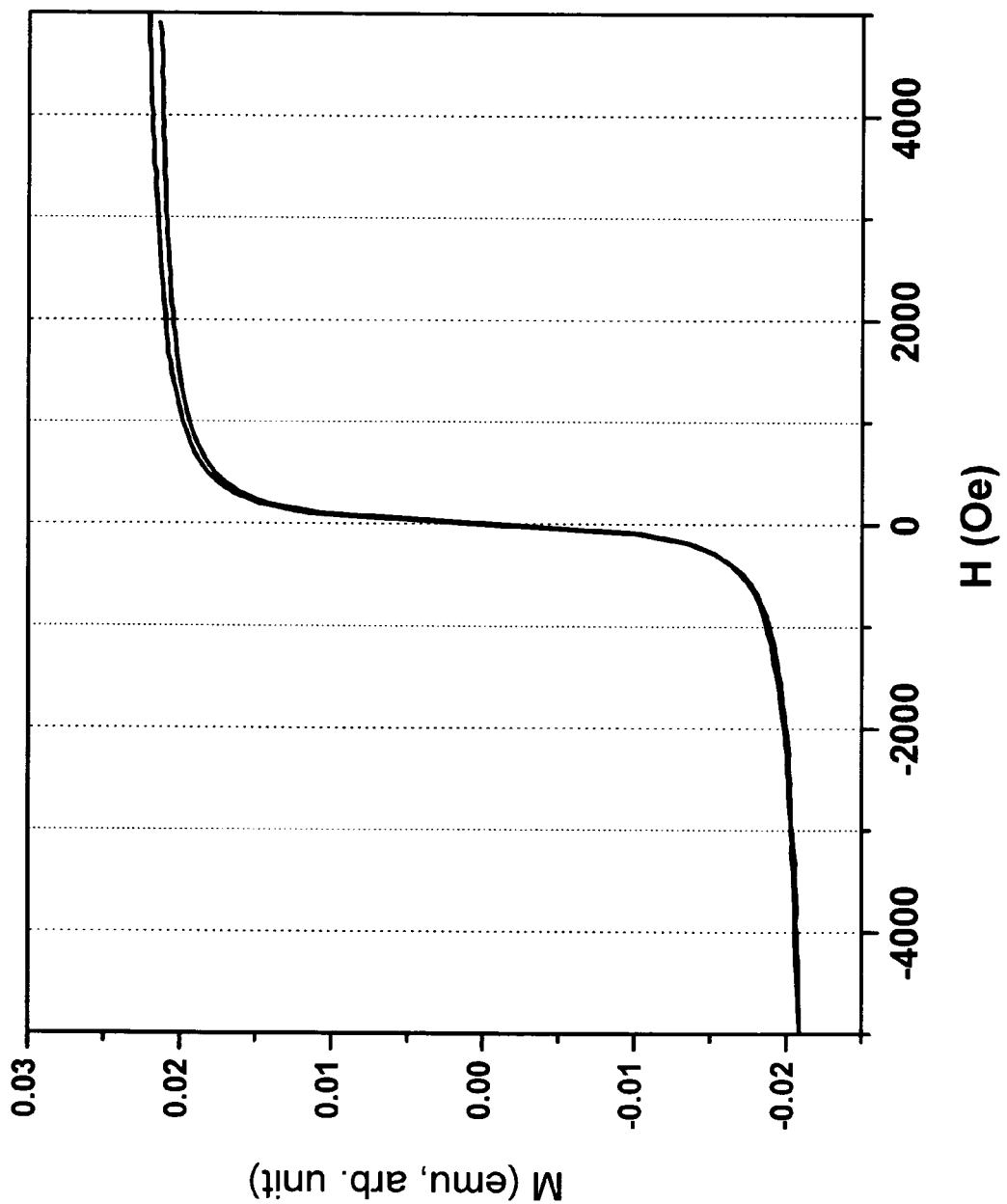
FIG. 15(B) is a graphical illustration of a VSM hysteresis loop of an assembly of $MnFe_2O_4/FeS$—Ag nanoprticles according to an embodiment of the invention.

FIGS. 14(A) and 14(B) illustrate the UN-vis spectra of the dumbbell-like nanoparticles before and after surface treatment. FIG. 14(A) illustrates the nanoparticles in a hexane solution and FIG. 14(B) illustrates the nanoparticles in a water solution. The strong absorption peak at approximately 425 nm is due to the surface plasmon of an Ag sphere in the dumbbell nanoparticles. FIGS. 15(A) and 15(B) illustrate the hysteresis loops of $Fe_3O_4$/FeS—Ag (FIG. 15(A)) and $MnFe_2O_4$/FeS—Ag nanoparticles (FIG. 15(B)). The loops are similar to those from starting magnetic nanoparticles, indicating the attachment of noble metal does not change the magnetic behavior dramatically. Combining with what is illustrated in FIGS. 14(A) through 15(B), it can be seen that the dumbbell-like nanoparticles include both a magnetic unit that shows superparamagnetic properties at room temperature, and an optic unit that show a strong surface plasmon at approximately 425 nm. As such, the nanoparticles can be used as both a magnetic label and an optic label.

The embodiments of the invention may be verified in accordance with the following examples:

EXAMPLE 1

Direct synthesis of A-B dumbbell-shaped particles 10 as described in Scheme 1 with A comprising 12 nm PbSe and B comprising 8 nm Au nanoparticles. 100 mg $HAuCl_4.3H_2O$ (0.25 mmol), 2 mL oleylamine (6 mmol), and 0.7 mL oleyl acid (2 mmol) are added to a hexane dispersion of PbSe nanoparticles (100 mg PbSe in 20 ml hexane). The solution is heated at 40° C. for 1 hour. The PbSe—Au dumbbell-shaped nanoparticles 10 are then separated from solution by adding ethanol and centrifugation. The particles are re-dispersed in any of the following organic solvents including toluene, hexane, butyl ether, etc. Similarly, various A-B dumbbell-shaped nanoparticles can be made with "A" comprising any of semiconducting PbS, CdSe, CdS, etc, and "B" comprising any of Au, Ag, Pt, and Pd.

EXAMPLE 2

General synthesis of A-B dumbbell-shaped particles as described in Scheme 1 with A comprising 6 nm Au and B comprising 12 nm $Fe_2O_3$ nanoparticles. 8 nm Au nanoparticles are formed by dissolving 1.0 g $HAuCl_4.3H_2O$ in a solution of oleyl amine (10 ml) in Toluene (100 ml) and heated to 80° C. for 2 hours. The gold nanoparticles are then separated from solution by adding ethanol and centrifugation. Au—$Fe_2O_3$ dumbbell-shaped particles with Au comprising 8 nm Au and $Fe_2O_3$ comprising 15 nm are formed by injecting 0.14 ml $Fe(CO)_5$ (1 mmol) into a solution of oleyl acid (1.0 ml, 3 mmol) in 20 ml octadecene at 130° C. The solution is retained at this temperature for 10 min before 1 ml hexane dispersion of gold nanoparticles (10 mg Au nanoparticles in 1 ml hexane) is added then, the solution is brought up to 300° C. for 1 hour. To convert the iron completely to $Fe_2O_3$, the solution is bubbled through oxygen at 200° C. for 1 hour. The dumbbell-shaped nanoparticles are then separated from solution by adding ethanol and centrifugation. The particles are re-dispersed in any of the following organic solvents including toluene, hexane, butyl ether, etc.

EXAMPLE 3

General synthesis of A-B nanoparticles 210 as described in Scheme 2. Au—$Fe_2O_3$ flower-like nanoparticles 210 with "A" comprising 8 nm Au and "B" comprising 10 nm $Fe_2O_3$. 0.14 ml $Fe(CO)_5$ (1 mmol) is injected into a solution of oleyl acid (1.0 ml, 3 mmol) in 20 ml phenyl ether at 110° C. The solution is retained at this temperature for 5 min before 1 ml hexane dispersion of gold nanoparticles (10 mg Au nanoparticles in 1 ml hexane) is added, and the solution is then brought up to reflux for 3 hours. To convert the iron completely to $Fe_2O_3$, the solution is bubbled through oxygen at 200° C. for 1 hour. The flower-shaped nanoparticles 210 are then separated from solution by adding ethanol and centrifugation. The nanoparticles 210 are re-dispersed in any of the following organic solvents such as toluene, hexane, butyl ether, etc.

EXAMPLE 4

General synthesis of A-B dumbbell-shaped particles 10 as described in Scheme 3 with "A" comprising 10 nm $Fe_3O_4$ and "B" comprising 4 nm Ag nanoparticles. Surface modification: $Fe_3O_4$ is treated with $1-C_{16}H_{33}SH$. Under $N_2$, the $Fe_3O_4$ nanoparticles (60 mg) in hexane (3 mL) are mixed with phenyl ether (20 mL), oleic acid (0.5 mmol), oleylamine (0.5 mmol), and $1-C_{16}H_{33}SH$ (0.5 mmol). The mixture is heated to 100° C. to remove the hexane and to reflux for 30 minutes. The heating source is removed and the black reaction mixture is cooled to room temperature. Ethanol is then added. The black product is precipitated and separated by centrifugation. Next, the yellow-brown supernatant is discarded and the black product is dispersed in hexane in the presence of oleic acid and oleyl amine. Any unsolved precipitation is removed by centrifugation. The FeS modified $Fe_3O_4$ nanocrystals are precipitated out by adding ethanol and centrifugation, and can be easily re-dispersed in alkane solvent, aromatic solvent and chlorinated solvent.

Dumbbell nanoparticle formation: Under $N_2$, $AgNO_3$ (0.5 mmol), Tetralin (20 mL) and oleylamine (2 mmol) are first mixed and stirred for approximately 10 minutes to make a clear solution. The hexane dispersion of FeS modified $Fe_3O_4$ (40 mg in 2 mL hexane) is then added to the solution and the mixture is heated to 100° C. for 1 hour. The heating source is removed and the dark red-brown reaction mixture is cooled to room temperature. Ethanol is added to precipitate the product. The dark red-brown product is separated from the solvent by a magnet and washed with ethanol. The product is then dispersed in hexane, thereby producing a dark red-brown dispersion. Similarly, any of $MFe_2O_4$ nanoparticles with M=Co, Mn, Ni, Mg, or Cu etc, or metallic nanoparticles of Co, Fe, Ni, Cu etc. can be used to make the dumbbell-shaped nanoparticles with the noble metal comprising Ag, Au, Pt, and Pd.

EXAMPLE 5

Synthesis of water soluble dumbbell-shaped nanoparticles 10. A hexane dispersion of dumbbell-shaped nanoparticles comprising $Fe_3O_4$/FeS—Ag are mixed with an aqueous solution of HS—$(CH_2)_{11}$—COOH and $Et_4NOH$ (approximately ⅓ molar ratio) and shaken for 5 minutes. The aqueous solution becomes reddish-brown and the hexane phase is discolored. The hexane is then removed and acetone is added to the aqueous solution until the solution become cloudy. The product is separated with a magnet and washed with acetone once. The product is then dispersed into water to produce a reddish-brown solution with a pH of approximately 7. Additionally, similar processes can be applied to other dumbbell-shaped nanoparticles to make them water-soluble.

Figure 16A:
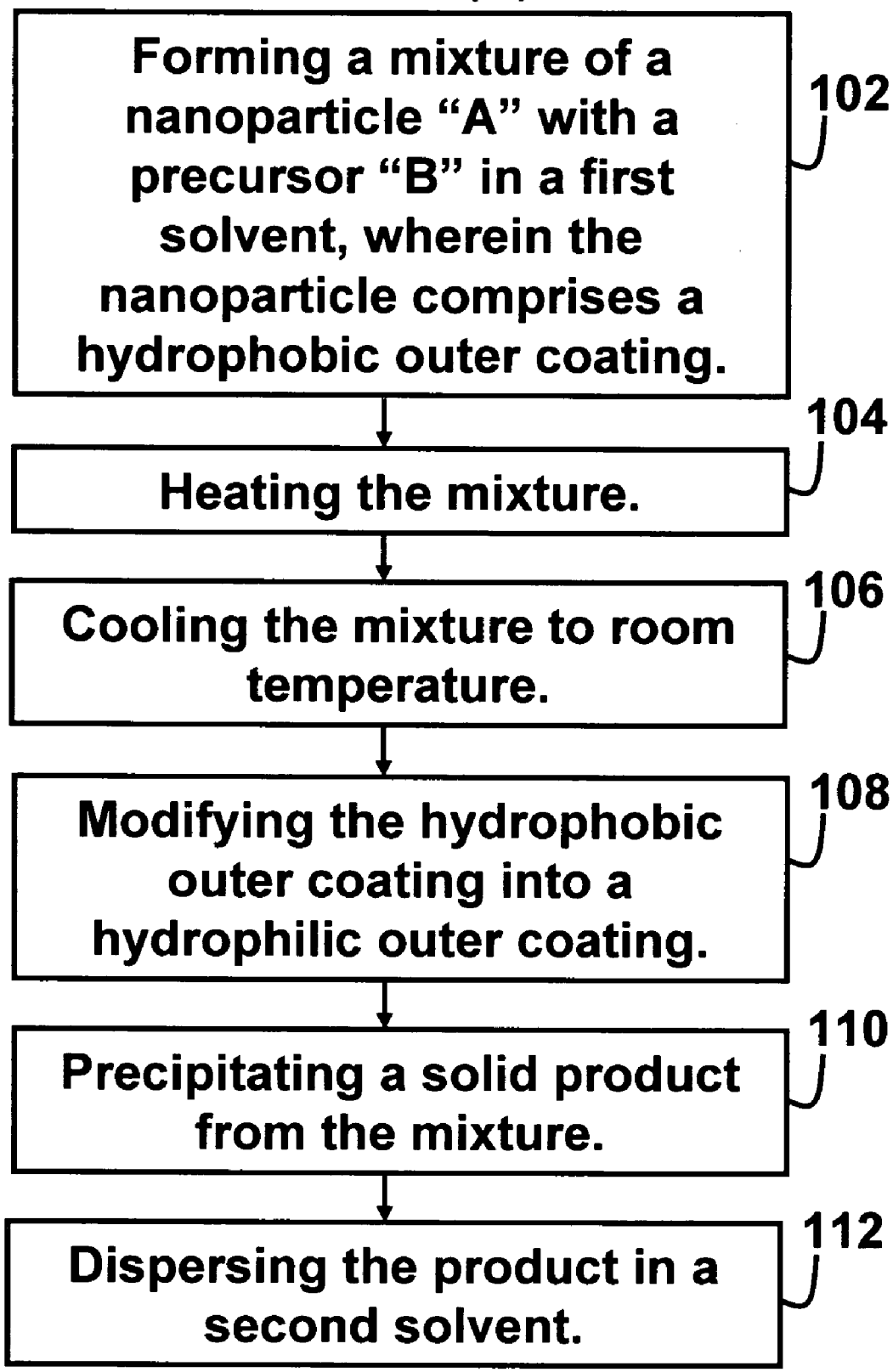
FIG. 16(A) is a flow diagram illustrating a preferred method according to a first embodiment of the invention.
Figure 16B:
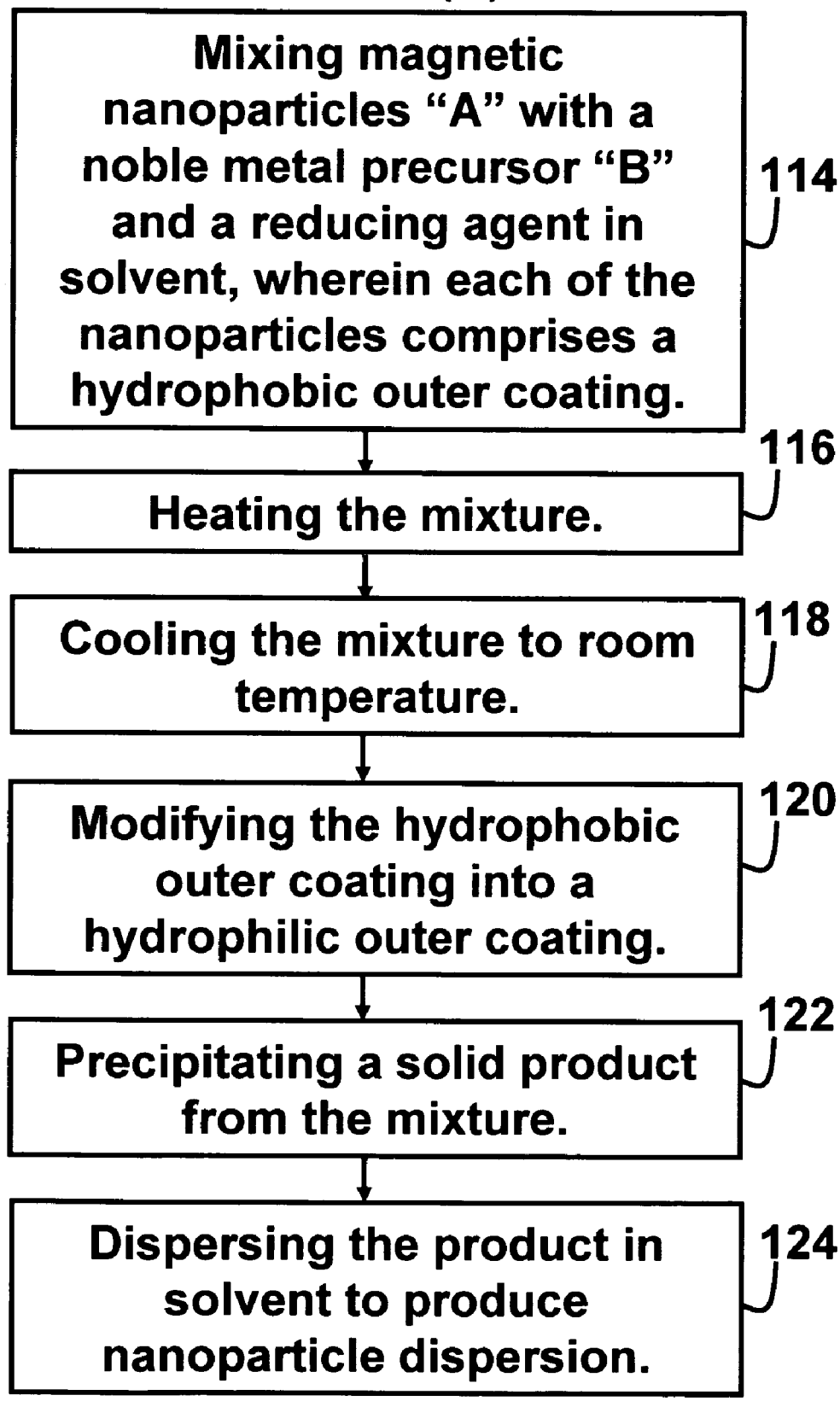
FIG. 16(B) is a flow diagram illustrating a preferred method according to a second embodiment of the invention.

FIGS. 16(A) through 16(C) illustrate flow diagrams according to the several embodiments of the invention, which refer to elements described in FIGS. 1 through 15(B). Specifically, FIG. 16(A) illustrates a process of making nanoparticles 10, 210, wherein the process comprises forming (102) a mixture of a nanoparticle "A" with a precursor "B" in a first solvent, wherein the nanoparticle comprises a hydrophobic outer coating; heating (104) the mixture; cooling (106) the mixture to room temperature; modifying (108) the hydrophobic outer coating into a hydrophilic outer coating; precipitating (110) a solid product from the mixture; and dispersing (112) the product in a second solvent. The nanoparticles comprise any of dumbbell-shaped nanoparticles 10 and flower-shaped nanoparticles 210. Additionally, the nanoparticles comprises any of a semiconducting, magnetic, and noble metallic material, wherein the nanoparticles comprise a first portion "A" comprising any of PbSe, PbS, CdSe, CdS, ZnS, Au, Ag, Pd, and Pt, wherein the precursor "B" comprises any of a cationic, neutral or particulate Au, Ag, Pd, Pt, or transition metal (Fe, Co, Ni) precursors of $Fe(CO)_5$, $Co(CO)_8$, $Ni(CO)_4$ or their analogues. Also, the reducing agent comprises any of an amine, alcohol, aldehyde, hydride, and a metallic reducing agent. Moreover, the first and second solvents comprise any of alkanes, arenes, ethers, nitriles, ketones, and chlorinated hydrocarbons. Furthermore, a reaction temperature of the process of making nanoparticles is in a range of 0° C. to 350° C.

A further aspect of the invention illustrated in FIG. 16(B) provides a process of making dumbbell-shaped nanoparticles, wherein the process comprises mixing (114) magnetic nanoparticles "A" with a noble metal precursor "B" and a reducing agent in solvent, wherein each of the nanoparticles comprises a hydrophobic outer coating; heating (116) the mixture; cooling (118) the mixture to room temperature; modifying (120) the hydrophobic outer coating into a hydrophilic outer coating; precipitating (122) product from the mixture, and dispersing (124) the product in solvent to produce nanoparticle dispersion.

Another embodiment of the invention is illustrated in FIG. 16(C), which provides a process of making dumbbell-shaped nanoparticles, wherein the process comprises applying a coating (126) to a nanoparticle "A" with a hydrophobic coating; mixing (128) the coated nanoparticle "A" with a noble metal precursor "B" and reducing agent in solvent to produce a mixture; heating (130) the mixture; cooling (132) the mixture to room temperature; modifying (134) the coating into a hydrophilic coating; precipitating (136) product from the mixture, and dispersing (138) the product in solvent to produce a nanocrystal dispersion. The coated material comprises any of sulfur-, selenium-, phosphorus-, and arsenic-inclusive materials. Additionally, the nanoparticles "A" comprise any of a metal, alloy, oxide, and sulfide. The noble metal precursor "B" comprises any of a cation, metal, and nanoparticles comprising any of Au, Ag, Pd, and Pt.

The structure depicted in FIG. 1 and the processes described in Scheme 1 and Scheme 2 as well as the above-described example can be readily extended to the synthesis of more complicated dumbbell-like nanoparticles with A or B comprising any of an elemental metal, alloy (or mixture), metal oxide, metal sulfide, metal selenide, or polymeric-form particles with the sizes of both A and B being tunable. Additionally, the nanoparticle materials may be implemented in several applications such as ferrofluid, data storage, sensor, biomedical imaging, drug delivery, bio-detection, and catalysis.

The embodiments of the invention provide a dumbbell-like nanostructure with one part of the dumbbell being magnetic or semiconducting and another part being noble metallic. The bifunctionality introduced by such a dumbbell structure could be used for various nanoelectronic and nanomagnetic applications. Moreover, the magnetic detection provided by the embodiments of the invention is capable of yielding a biosensor suitable for single biomolecule detection. For example, to make magnetic nanoparticles for sensitive bio-label applications, nanoparticles are made that can site-specifically bind to a DNA strand. The surface area for site-specific binding is preferably small to ensure that only one, or at most, several biomolecules can be accommodated around the particle surface. Further, to facilitate the magnetic detection, the magnetic particles are preferably superparamagnetic with a high moment and high permeability.

The dumbbell-like nanoparticles provided by the embodiments of the invention have numerous advantages over currently used nanoparticle systems. They can be made easily from solution phase synthesis. The size of any one part in the dumbbell structure can be tuned. The structure has small noble metal surface from a dot of less than 5 nm for site-specific binding of a single or, at most, a few biomolecules. The structure also has size-tunable magnetic or semiconducting dot from which an optimum magnetic or optic signal can be generated and detected. Further, such dumbbell structure may be used to connect two narrowly separated electrodes to form a nano-contact between two electrodes, a key step for future fabrication of spintronic devices.

Generally, the embodiments of the invention provide a colloidal nanoparticle comprising a magnetic portion; a metallic portion adjacent to the magnetic portion; and a modifiable hydrophobic outer layer over the magnetic portion and the metallic portion, wherein the modifiable hydrophobic outer layer is adapted to be transformed into a hydrophilic outer layer, and wherein each of the magnetic and metallic portions comprise surfaces adapted to be modified. Moreover, the magnetic portion and the metallic portion are arranged in a dumbbell-like configuration or flower-like configuration. The dumbbell-shaped colloidal nanoparticles provided by the embodiments of the invention are unique from the widely studied core-shell structures because the dumbbell-shaped nanoparticles comprise two different surfaces that provide two platforms for different surface chemistry in one particle. Such a characteristic is currently not available for core-shell structures that have only one type of surface. Furthermore, the embodiments of the invention provide the first known example of a flower-shaped nanoparticle. The advantage of this flower-like structure is that one single particle provides a stronger magnetic signal than conventional nanoparticles. That is, the totality of several petal (flower-like) magnetic nanoparticles, which maintains chemical solubility, is unique. Generally, the flower-shape nanoparticles comprise a plurality of dumbbell-shaped nanoparticles arranged in a flower-like shape.

Conversely, for conventional nanoparticles, in order to provide a magnetic signal comparable to the magnetic signal provided by the flower-shaped nanoparticles of the embodiments of the invention, the size of the conventional nanoparticles would have to be configured much too large to be soluble. Furthermore, the conventional nanoparticles in such a configuration would become ferromagnetic instead of superparamagnetic. In addition, a flower-shaped nanoparticle has a free gold surface for surfactant attachment that is otherwise unavailable in a conventional core-shell structure. Accordingly, the embodiments of the invention provide the example of nanoparticles having dumbbell and flower-shaped structures comprising a magnetic particle as the first part and a metal portion as the second part, and having both surfaces (magnetic and metal surfaces) available for surface modification, which is different from that of a conventional core-shell structure having only one type of surface available for modification.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A process of making dumbbell-shaped nanoparticles, said process comprising:
    mixing nanoparticles with a noble metal precursor and a reducing agent in solvent, wherein each of said nanoparticles comprises a hydrophobic outer coating; heating the mixture;
    cooling said mixture to room temperature;
    modifying said hydrophobic outer coating into a hydrophilic outer coating;
    precipitating product from said mixture; and
    dispersing said product in solvent to produce nanoparticle dispersion.

2. The process of claim 1, wherein said nanoparticles comprise any of metal, alloy, oxide, and sulfide.

3. The process of claim 1, wherein said noble metal precursor comprises any of a cation or metal, and nanoparticles comprising any of Au, Ag, Pd, and Pt.

4. The process of claim 1, wherein said reducing agent comprises any of an amine, alcohol, aldehyde, hydride, and a metallic reducing agent.

5. The process of claim 1, wherein said solvent comprises any of alkanes, arenes, ethers, nitriles, ketones, and chlorinated hydrocarbons.

6. A process of making dumbbell-shaped nanoparticles, said process comprising:
    applying a coating to a nanoparticle;
    mixing the coated nanoparticle with a noble metal precursor and reducing agent in solvent to produce a mixture;

heating the mixture;
cooling said mixture to room temperature;
modifying said coating into a hydrophilic coating;
precipitating product from said mixture; and
dispersing said product in solvent to produce a nanocrystal dispersion.

7. The process of claim 6, wherein said coated nanoparticle comprises any of sulfur-, selenium-, phosphorus-, and arsenic-inclusive materials.

8. The process of claim 6, wherein said nanoparticles comprise any of a metal, alloy, oxide, and sulfide.

9. The process of claim 6, wherein said noble metal precursor comprises any of a cation, metal, and nanoparticles comprising any of Au, Ag, Pd, and Pt.

10. The process of claim 6, wherein said reducing agent comprises any of an amine, alcohol, aldehyde, hydride, and a metallic reducing agent.

11. The process of claim 6, wherein said solvent comprises any of alkanes, arenes, ethers, nitriles, ketones, and chlorinated hydrocarbons.

* * * * *